US008782618B1

(12) United States Patent
Gaudette

(10) Patent No.: US 8,782,618 B1
(45) Date of Patent: Jul. 15, 2014

(54) INSTRUMENT BASED PROCESSING

(75) Inventor: Thomas Gaudette, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1405 days.

(21) Appl. No.: 12/102,423

(22) Filed: Apr. 14, 2008

Related U.S. Application Data

(60) Provisional application No. 61/010,329, filed on Jan. 8, 2008.

(51) Int. Cl.
*G06F 9/45* (2006.01)

(52) U.S. Cl.
CPC .................................. *G06F 8/40* (2013.01)
USPC ........................................................ 717/136

(58) Field of Classification Search
CPC ........................................................ G06F 8/40
USPC ........................................................ 717/136
See application file for complete search history.

(56) References Cited

U.S. PATENT DOCUMENTS

| | | | |
|---|---|---|---|
| 4,901,221 A | 2/1990 | Kodosky et al. | |
| 5,301,336 A | 4/1994 | Kodosky et al. | |
| 6,219,628 B1 | 4/2001 | Kodosky et al. | |
| 6,608,638 B1 | 8/2003 | Kodosky et al. | |
| 6,784,903 B2 | 8/2004 | Kodosky et al. | |
| 6,948,160 B2* | 9/2005 | Click et al. | 717/148 |
| 7,895,584 B1* | 2/2011 | Ma et al. | 717/144 |
| 2002/0062475 A1* | 5/2002 | Iborra et al. | 717/108 |
| 2004/0243935 A1* | 12/2004 | Abramovitch | 715/523 |
| 2005/0060706 A1* | 3/2005 | Doyon et al. | 718/100 |
| 2006/0005169 A1* | 1/2006 | Berstis et al. | 717/125 |
| 2007/0006178 A1* | 1/2007 | Tan | 717/136 |
| 2008/0127128 A1* | 5/2008 | Mateescu et al. | 717/139 |

OTHER PUBLICATIONS

"LabVIEW FPGA Module Release and Upgrade Notes Version 8.2," National Instruments Corporation, Jul. 2006, pp. 1-12.
Understanding How to Program FPGA VIs (FPGA Module), National Instruments Corporation, Aug. 2006, pp. 1-2.
"Simulink HDL Coder: For Use with MATLAB and Simulink User's Guide Version 1," The MathWorks, Inc., Apr. 2006, pp. i-viii, 1-1 to 1-10, 2-1 to 2-32, and Index-1 to Index-7.
Wenban, Alan and Geoffrey Brown, "A Software Development System for FPGA-Based Data Acquisition Systems," IEEE,1996, pp. 28-37.
Wenban, Alan et al., Developing Interface Libraries for Reconfigurable Data Acquisition Boards, Springer-Verlag 1995, pp. 331-340.

* cited by examiner

*Primary Examiner* — Wei Zhen
*Assistant Examiner* — Lanny Ung
(74) *Attorney, Agent, or Firm* — Cesari and McKenna, LLP; Michael R. Reinemann

(57) ABSTRACT

A computer-readable media may store instructions for receiving text-based technical computing code from a first technical computing environment running on a remote computer, where the first technical computing environment includes a set of functions. The media may store instructions for processing data captured using an instrument, where the data is processed using the received technical computing code in a second technical computing environment that includes a subset of the functions, where the captured data processed in non-real-time, and where the processing produces a result. The media may store instructions for translating the technical computing code from a first format compatible with the second technical computing environment into a second format adapted for parallel execution by a field programmable gate array (FPGA), the translating performed by a code generator when the result is satisfactory. The media may store instructions for processing input data in real-time using the FPGA.

28 Claims, 20 Drawing Sheets

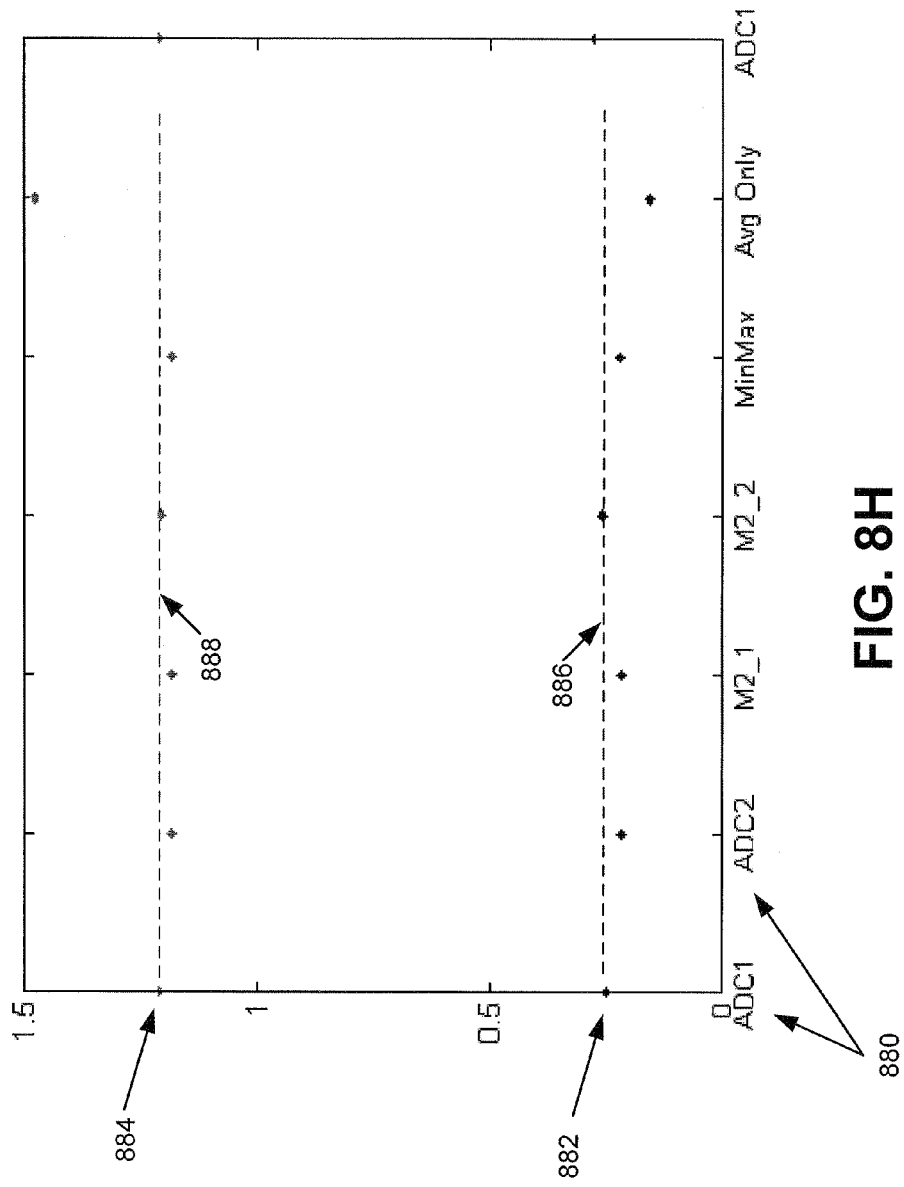

US 8,782,618 B1

INSTRUMENT BASED PROCESSING

RELATED APPLICATIONS

This application claims the benefit of provisional patent application No. 61/010,329, filed Jan. 8, 2008, the content of which is incorporated herein by reference.

BACKGROUND INFORMATION

In certain technical disciplines, such as engineering, instruments may be used to acquire and process data. For example, an engineer may be designing a system to minimize vehicle vibrations. The engineer may need to acquire and analyze vibration measurement data from sensors attached to a chassis of a vehicle in order to validate his design. For example, the engineer may capture data from the sensors using an instrument, such as a spectrum analyzer or oscilloscope. The engineer may wish to process this data in real-time using algorithms that will be run in the vibration canceling system installed in the vehicle, since the vibration canceling system will need to operate in real-time when canceling vibrations in an operational vehicle.

The engineer may ask a software developer to design vibration cancelling algorithms in software. The software developer may determine that algorithms should be written in a non-real-time high level language that runs on desktop computers since the high level language is more intuitive for the software developer to use than low level real-time languages (e.g., assembly code). For example, the developer may prefer to write code for the algorithms using a high level language like C, C++, or Java.

After the algorithms are written, the software developer may wish to test the debugged algorithms using continuous, or real-time, data to determine whether the algorithms will work in a real-time application running in the vehicle. For example, the software developer may know that processing real-time data may realistically identify how a deployed vibration canceling system will operate in the vehicle.

The software developer may be unable to process real-time data on the desktop computer because the computer may not support real-time processing. For example, an operating system (e.g., Windows) on the computer may only handle 32-bit information and real-time processing may require, for example, 64-bit information because of the large number of samples needed for real-time processing of vibration data.

The software developer may need to get help from the engineer to test his algorithms in a real-time environment because the instrument operated by the engineer may be the only device that can process real-time vibration data. The software developer may ask the engineer to encode the algorithms developed in the high level language into a real-time portion of the instrument so that real-time vibration data can be processed using the developed algorithms.

Porting the developed algorithms into a real-time format for use in the instrument may require that the engineer manually translate the algorithms from the high level language to a lower level language, such as a hardware description language (HDL), that runs in the real-time portion of the instrument. The engineer may need to hand code the HDL implementation of the algorithms into the instrument. The engineer may then need to debug the HDL algorithms before he can process real-time vibration data with the HDL algorithms.

This manual process of translating algorithms from high level, non-real-time environments into a format compatible with real-time instruments can be tedious, time consuming, require two or more people, and can be prone to error. As a result, developers and/or engineers may be disinclined to write algorithms for execution in an instrument.

SUMMARY

In accordance with an embodiment, one or more computer-readable media storing executable instructions that when executed by processing logic process input data is provided. The media may store one or more instructions for receiving technical computing code from a first technical computing environment running on a remote computer, the first technical computing environment including a set of functions. The media may also store one or more instructions for processing data captured using an instrument, where the data is processed using the received technical computing code in a second technical computing environment that includes a subset of the functions, the captured data processed in non-real-time, the processing producing a result. The media may also store one or more instructions for translating the technical computing code from a first format compatible with the second technical computing environment into a second format adapted for parallel execution by a specialized processing device, the translating performed by a code generator when the result is satisfactory. The media may store one or more instructions for processing input data in real-time using the specialized processing device.

In accordance with another embodiment, one or more computer-readable media storing executable instructions that when executed by processing logic perform real-time processing of data is provided. The media may store one or more instructions for interacting with a first technical computing environment that supports creating technical computing code, the first technical computing environment being weakly typed. The media may further store one or more instructions for sending technical computing code from the first technical computing environment to a second technical computing environment that operates on an instrument. The technical computing code may be configured to run in the second technical computing environment to evaluate one or more algorithms used for processing the data in non-real-time, run outside the second technical computing environment on parallel processing logic in the instrument to process the data in real-time, the technical computing code converted from a first format to a second format using the instrument, where the first format is compatible with the second technical computing environment running on the instrument and where the second format is compatible with the parallel processing logic, and to generate a result based on the real-time processing of the data, the result displayed via a display, stored in storage, or transferred to a destination.

In accordance with yet another embodiment, a computer-implemented method for processing real-time data using an instrument is provided. The method may include producing technical computing code in a technical computing environment on a client device, the technical computing environment implementing technical computing functionality when the technical computing code is executed. The method may further include processing a first data file received from an instrument using the technical computing code to produce a client result, the client result indicating whether an algorithm implemented in the technical computing code is satisfactory. The method may include sending the technical computing code to a second technical computing environment operating on the instrument, the second technical computing environment providing at least a subset of the technical computing functionality. The method may further include processing a second data file using the algorithm to produce an instrument result, the second data file including data acquired by the instrument. The method may include converting the algorithm from a first format compatible with the second technical computing environment into a second format compatible with real-time logic on the instrument, the converting performed when the instrument result is satisfactory. The method may further include executing the algorithm in the real-time logic, and processing input data using the executing algorithm to produce a real-time result.

In accordance with another embodiment, a system is provided. The system may include a computing device that includes storage logic to store technical computing code that implements an algorithm in a technical computing environment, the algorithm for processing a data file. The system may further include processing logic to process the data file using the technical computing code to produce a first result, and to determine whether the first result should be sent. The system may also include interface logic to send the technical computing code when the processor determines that the technical computing code should be sent. The system may further include an instrument that includes non-real-time logic to execute the technical computing code received from the interface logic, process the data file or another data file using the received technical computing code to produce a second result, modify the algorithm when the second result is determined to be unsatisfactory, the modifying producing modified technical computing code, and convert the received technical computing code or the modified technical computing code into a real-time format, the real time format including the algorithm or the modified algorithm, respectively. The instrument may further include real-time logic to receive the real-time format, and process input data using the algorithm or the modified algorithm, the processing performed in real-time to produce a result.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 8H illustrates an exemplary plot showing the results of the techniques illustrated in FIGS. 8A-8G;

DETAILED DESCRIPTION

Figure 1:
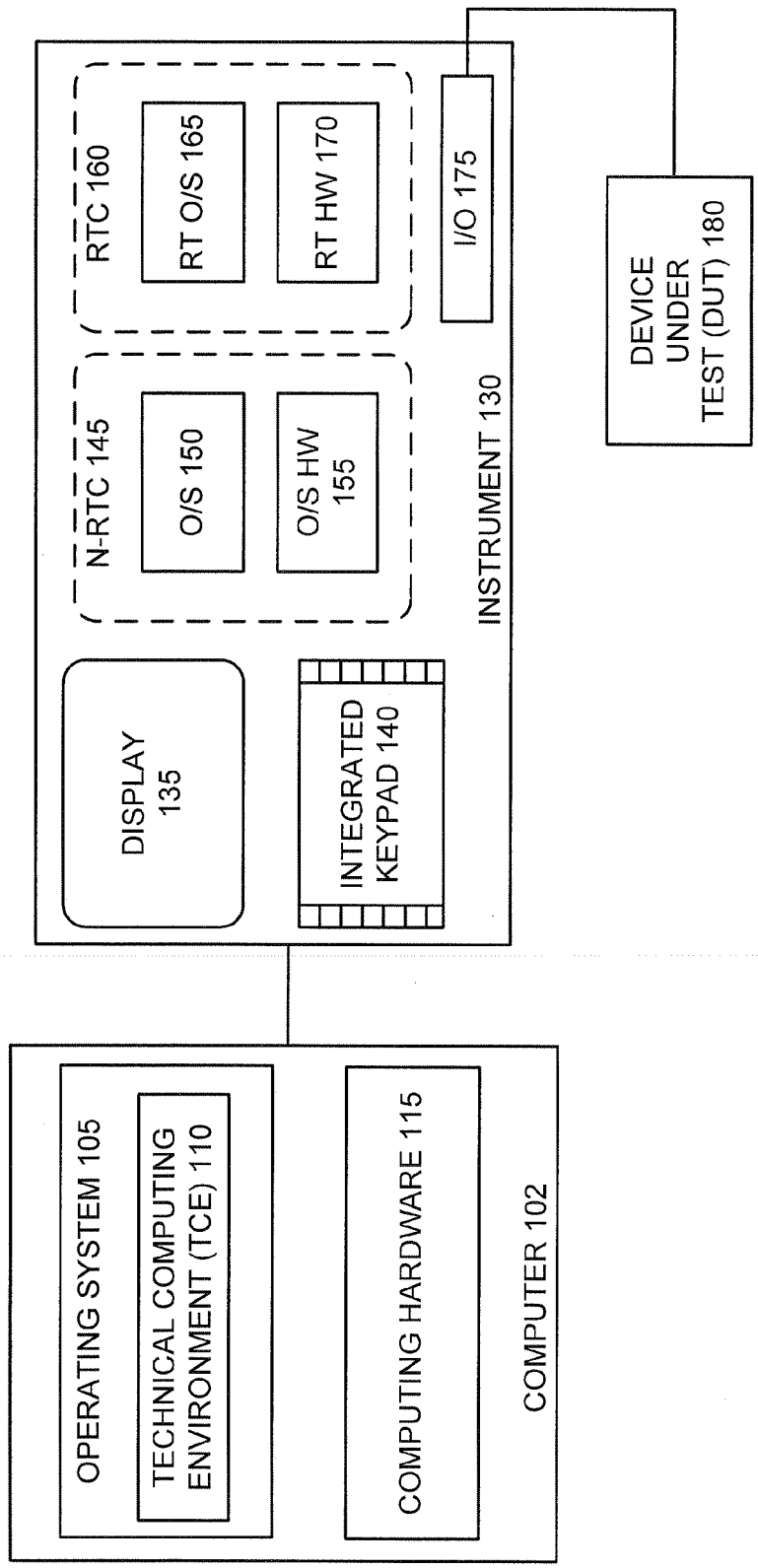
FIG. 1 illustrates an exemplary system for practicing an embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Introduction

Exemplary embodiments disclosed herein allow a user to generate algorithms that can be implemented in real-time processing systems or devices, such as instruments, without requiring that the user hand code the algorithms into these devices. For example, embodiments may allow a user to develop algorithms in a high level language, such as a technical computing language, that lets the user develop and test algorithms using representations that are easy for the user to understand and use. In addition, a high level language may include libraries of functions and/or robust debugging utilities that facilitate rapid algorithm development and testing.

Real-time systems, or devices, can be ones in which time plays an essential role. For example, one or more physical devices external to a processing device (e.g., a computer or an instrument) may generate stimuli, and the processing device must react appropriately to the stimuli within a fixed amount of time. In real-time applications, obtaining a correct answer with a processing device too late may be as bad as not obtaining an answer at all. For example, producing the late answer may cause an application, such as a real-time control application, to terminate or become unstable.

Assume that a user wants to develop an algorithm to process real-time data on an instrument. The user may acquire a data file using the instrument and may send the data file to a computer that runs a high level language. The user may develop and debug the algorithm using the data file in a non-real-time environment since the data file represents previously acquired and/or stored data.

Once the user is satisfied with the algorithm, the user may send the developed algorithm from the high level language on the computer to a compatible high level language running on the instrument. For example, the user may run a Windows XP operating system on the computer and a C++ development environment to develop the algorithm in a high level language that is C++. The user may send the developed algorithm to a Windows XP environment and reduced capability C++ development environment that operates on the instrument. The user may further test and/or modify the algorithm on additional pieces of non-real-time data on the instrument. The instrument may run a reduced version of the C++ environment because of storage limitations, processor limitations, user interface limitations (e.g., a small display area), etc.

The user may wish to further test the algorithm on the instrument in non-real-time to get a better understanding of whether the algorithm will meet the user's needs. When the user is satisfied with the algorithm, the user may use an exemplary embodiment to generate executable code that can be used to process data in real-time on the instrument. For example, the user may select a code generator that interacts with the non-real-time environment on the instrument. The user may use the code generator to select a specialized processor, such as a real-time processor (e.g., a field programmable gate array (FPGA)), in the instrument and to further generate executable code for the real-time processor. For example, the user may generate executable hardware description language (HDL) code that runs on the FPGA in the instrument. The FPGA may execute the HDL code to process incoming data in real-time. Exemplary embodiments may allow code to be transferred from non-real-time environments to real-time environments without requiring that the user hand code information into the real-time environment.

Exemplary embodiments may also allow code to be transferred between environments having different characteristics. For example, a user may develop algorithms in an environment that is weakly typed, in that the environment handles many data types, such as int, double, floating point, etc. The embodiments may allow the user to transfer the developed algorithms to a strongly typed environment, such as a fixed point environment, and to execute the algorithms in the strongly typed environment.

Embodiments may also include serialized processing characteristics and parallelized processing characteristics. For example, the weakly typed environment may perform serialized processing while the fixed point environment may perform parallelized processing to allow real-time operation Embodiments may also optimize code for a particular environment without requiring that the user manually identify optimization techniques or that the user identify locations in the code that can be optimized.

Exemplary System

FIG. 1 illustrates an exemplary system 100 for practicing an embodiment. System 100 may include computer 102, instrument 130 and device under test (DUT) 180. The system in FIG. 1 is illustrative and other embodiments of system 100 can include fewer devices, more devices, and/or devices in configurations that differ from the configuration of FIG. 1.

Computer 102 may include a device that performs processing operations, display operations, communication operations, etc. For example, computer 102 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results. Computer 102 may include logic, such as one or more processing or storage devices, that can be used to perform and/or support processing activities on behalf of a user.

Computer 102 may further perform communication operations by sending data to or receiving data from another device, such as instrument 130. Data may refer to any type of machine-readable information having substantially any format that may be adapted for use in one or more networks and/or with one or more devices. Data may include digital information or analog information. Data may further be packetized and/or non-packetized.

Computer 102 may include operating system 105, technical computing environment (TCE) 110, and computing hardware 115 in an embodiment. Operating system 105 may include logic that manages hardware and/or software resources associated with computer 102. For example, operating system 105 may manage tasks associated with receiving user inputs, operating TCE 110, allocating memory, prioritizing system requests, etc. In an embodiment, operating system 105 can be a virtual operating system. Embodiments of O/S 105 may include Linux, Mac OS, Microsoft Windows, Solaris, Unix, etc.

TCE 110 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

TCE 110 may include a dynamically typed language that can be used to express problems and/or solutions in mathematical notations familiar to those of skill in the relevant arts. For example, TCE 110 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

TCE 110 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 110 may further provide mathematical functions and/or graphical tools (e.g., for creating plots, surfaces, images, volumetric representations, etc.). In one implementation, TCE 110 may provide these functions and/or tools using toolboxes (e.g., toolboxes for signal processing, image processing, data plotting, parallel processing, optimization, etc.). In another implementation, TCE 110 may provide these functions as block sets (e.g., an optimization block set). In still another implementation, TCE 110 may provide these functions in another way, such as via a library, etc. In an embodiment, TCE 110 may be implemented as a text based environment that allows a user to develop algorithms and other code using text. For example, TCE 110 may allow a user to enter free form text that can include variable length phrases, can include sentence like punctuations and/or structures, etc.

Computing hardware 115 may include hardware based logic that executes instructions in computer 102 to perform operations, such as operations performed on behalf of a user. For example, computing hardware 115 may execute instructions to store information, generate results, display information to a user, send information to instrument 130, receive information from instrument 130, etc.

Instrument 130 may include a device that processes data. For example, instrument 130 may receive analog or digital data and may process the data to produce a result. Embodiments of instrument 130 can include oscilloscopes, spectrum analyzers, waveform analyzers, receivers, etc. An embodiment of instrument 130 may include display 135, integrated keypad 140, non-real-time computer (N-RTC) 145, real-time computer (RTC) 160, and input/output interface (I/O) 175.

Display 135 may include logic for displaying information to a user. In an embodiment, display 135 may display results of non-real-time and/or real-time processing of input data to a user. Embodiments of display 135 may include touch sensitive displays, flat screen displays, etc.

Integrated keypad 140 may include logic that receives user inputs. For example, integrated keypad 140 may include keys enclosed in a weather tight membrane that receive inputs from a user. The keys may generate signals that can be used by other logic operating in instrument 130 to perform operations in response to the user inputs.

N-RTC 145 may include logic that executes instructions to perform non-real-time operations in instrument 130. In an embodiment, N-RTC 145 may include a computer that includes a non-real-time operating system, a storage device, a bus, and a processor. The computer may be able to run applications that can be run on computer 102, such as a version of a TCE. In the embodiment of FIG. 1, N-RTC 145 may include operating system (O/S) 150 and operating system hardware (O/S HW) 155.

O/S 150 may include logic that manages hardware and/or software resources associated with computer N-RTC 145. For example, O/S 150 may manage a version of a TCE that runs on instrument 130, data accessed by the TCE, results stored from the TCE, results displayed from the TCE, etc. In an embodiment, O/S 150 may be compatible with O/S 105 that runs on computer 102. O/S HW 155 may include hardware based logic that runs O/S 150 and/or interacts with O/S 150. For example, O/S HW 155 may include processors, storage (volatile and non-volatile), display devices, etc.

RTC 160 may include logic that implements real-time computing capabilities on instrument 130. RTC 160 can be implemented in instrument 130 as a removable board or as a permanent assembly. Implementations of RTC 160 may include a real-time operating system (RT O/S) 165 and real-time hardware (RT HW) 170.

RT O/S 165 may include logic that manages hardware and/or software resources associated with RTC 160. For example, RT O/S 165 may be a multitasking operating system that supports real-time operations in RTC 160. Real-time operations that can be managed by RT O/S 165 can include receiving information, such as executable code, from N-RTC 145; controlling hardware that acquires real-time data, real-time processing of acquired data, buffering real-time data during processing, storing processed real-time data, displaying results of real-time processing, etc.

RT HW 170 may include hardware based logic that supports real-time tasks in RTC 160. For example, RT HW 170 may perform receiving, processing, buffering, storing, transmitting, etc., operations in RTC 160. For example, RT HW 170 may include one or more specialized processing devices for processing real-time data, random access memories (RAMs) for storing processed real-time data, and communication components for transferring information between N-RTC 145 and RTC 160.

I/O 175 may include logic that receives information from DUT 180 and/or that sends information to DUT 180. For example, I/O 175 may receive real-time data from DUT 180 while DUT 180 operates. I/O 175 may make the acquired real-time data available to RTC 160 for real-time processing.

DUT 180 may be an animate or inanimate object that can provide data to a destination. DUT 180 may provide data to a destination directly or indirectly. For example, DUT 180 may directly provide data to instrument 130 when DUT 180 is a device generating electromagnetic signals that are presented to I/O 175. DUT 180 may indirectly provide data to instrument 130 when DUT 180 is a structure to which sensors and/or actuators are affixed. Here, the actuators may vibrate the structure and the sensors (e.g., accelerometers) may convert detected displacements into electrical signals that are sent to instrument. In another example, DUT 180 may indirectly provide data to instrument when DUT 180 is a living organism that gives off heat, where the heat is detected by a thermocouple that converts the temperature into an electrical signal that is sent to instrument 130.

Figure 2:
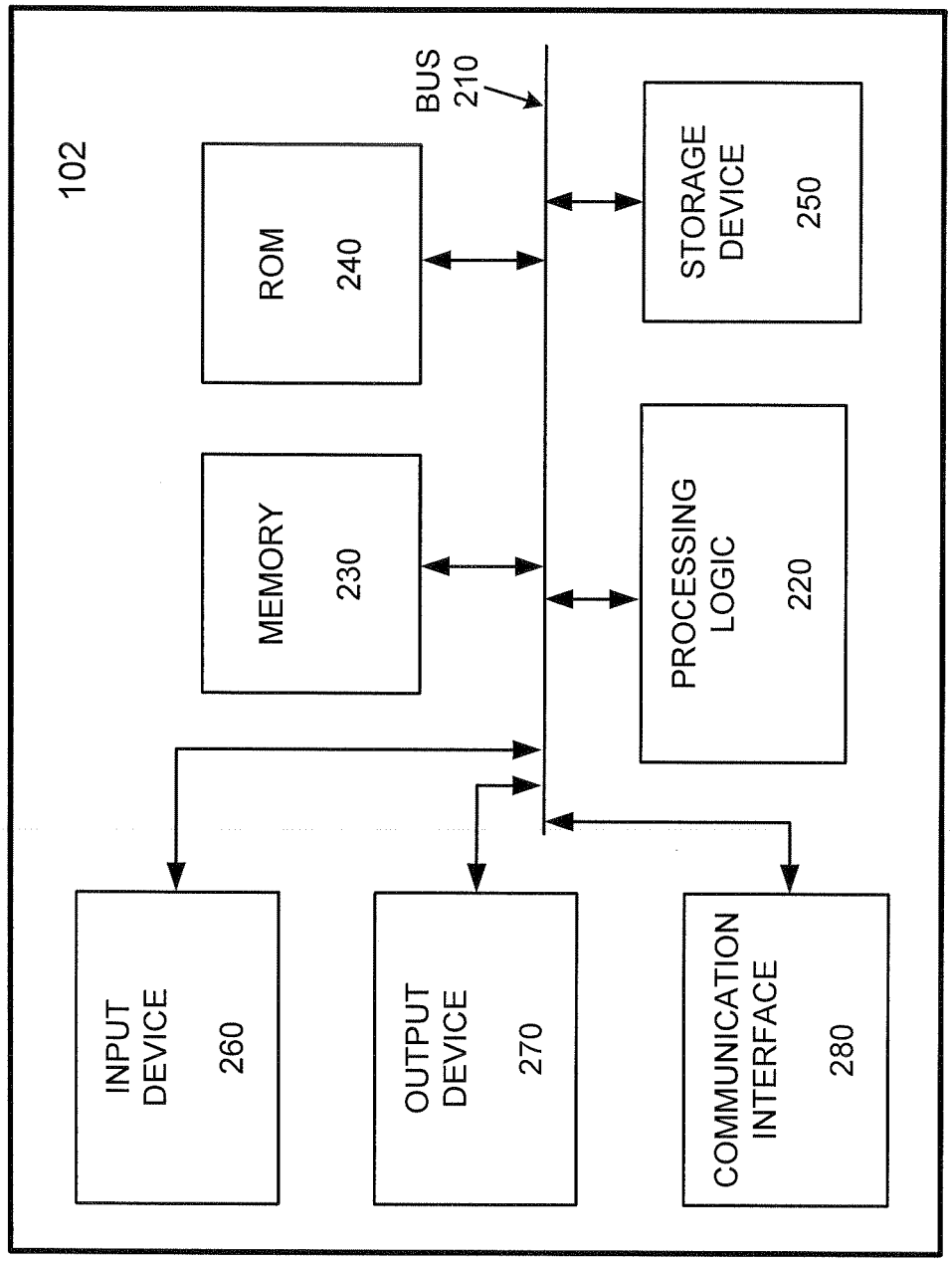
FIG. 2 illustrates an exemplary computer architecture that can be used to the computer or the non-real-time computer of FIG. 1.

FIG. 2 illustrates an exemplary computer architecture that can be used to implement computer 102 or N-RTC 145 of FIG. 1. FIG. 2 is an exemplary diagram of an entity corresponding to computer 102 and/or N-RTC 145. As illustrated, the entity may include a bus 210, processing logic 220, a main memory 230, a read-only memory (ROM) 240, a storage device 250, an input device 260, an output device 270, and/or a communication interface 280. Bus 210 may include a path that permits communication among the components of the entity.

Processing logic 220 may include a processor, microprocessor, or other types of processing logic that may interpret and execute instructions. In one implementation, processing logic 220 may include a single core processor or a multi-core processor. In another implementation, processing logic 220 may include a single processing device or a group of processing devices, such as a processor cluster or computing grid. In still another implementation, processing logic 220 may include multiple processors that may be local or remote with respect each other, and may use one or more threads while processing. In a further implementation, processing logic 220 may include multiple processors implemented as hardware units of execution capable of running copies of a technical computing environment.

Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive, or another type of static storage device (e.g., a disk drive) that may store static information and/or instructions for use by processing logic 220.

Input device 260 may include logic that permits an operator to input information to the entity, such as a keyboard, a mouse, a pen, a microphone, voice recognition and/or biometric mechanisms, etc. Output device 270 may include logic that outputs information to the operator, including a display, a printer, a speaker, etc. Communication interface 280 may include any transceiver-like logic that enables the entity to communicate with other devices and/or systems. For example, communication interface 280 may include mechanisms for communicating with another device or system via a network.

The entity depicted in FIG. 2 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of the entity, in other implementations, the entity may contain fewer, different, or additional components than depicted in FIG. 2. In still other implementations, one or more components of the entity may perform one or more tasks described as being performed by one or more other components of the entity.

Exemplary Technical Computing Environments

Figure 3:
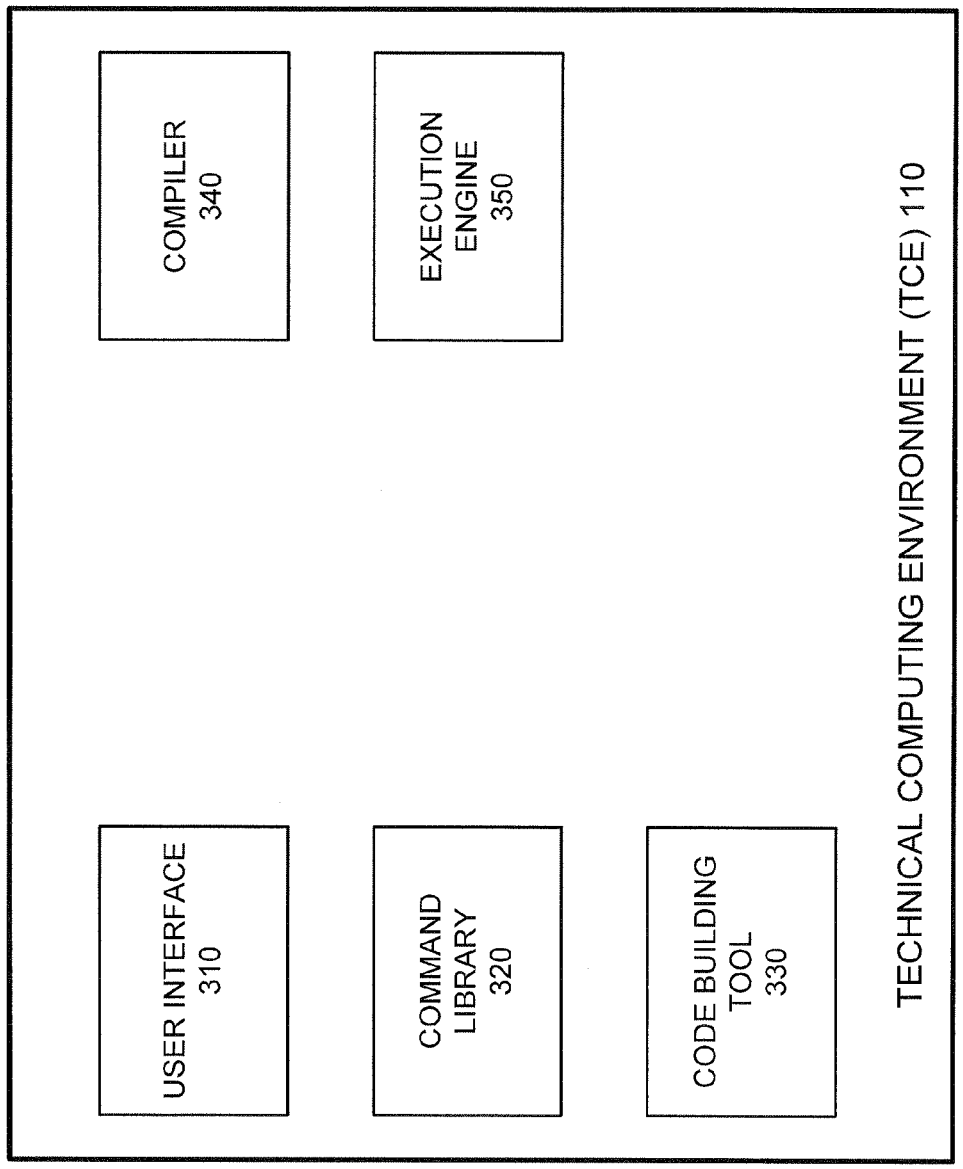
FIG. 3 illustrates an exemplary technical computing environment that can be used on the computer of FIG. 1.

FIG. 3 illustrates an exemplary TCE, e.g., TCE 110, that can be used on computer 102 of FIG. 1. TCE 110 can include user interface 310, command library 320, code building tool 330, compiler 340 and execution engine 350. User interface 310 may include logic that allows a user to interact with TCE 110. User interface 310 can include a text-based interface or a graphical interface, such as a graphical user interface (GUI) to receive information from the user and to display information to the user. For example, an embodiment of user interface 310 may include a window that displays text-based code to the user as they user enters text via a keyboard.

Command library 320 may include logic that stores commands used by TCE 110. For example, TCE 110 may store commands that are used to process, display, receive, send, store, edit, etc., data or instructions that are used by TCE 110. TCE 110 can interact with commands in other ways, such via a drag-and-drop palette, a database, etc.

Code building tool 330 may include logic that allows a user to create code to perform operations in TCE 110. Embodiments of code building tool 330 may include a source code editor, a command line interpreter, etc., in which a user develops source code. Code building tool 330 may allow a user to create source code that represents operations that can be performed on data processed using TCE 110. For example, code building tool 330 may allow the user to create algorithms using code compatible with TCE 110.

Compiler 340 may include logic that translates source code into a target language. In an embodiment, compiler 340 may convert the source code into a target code (e.g., object code), where the object code can be executed on computer 102. Compiler 340 may interact with other types of logic, such as linking logic, when transforming source code into target code.

Execution engine 350 may include logic that executes target code, such as object code. For example, a user may write source code using code building tool 330 and commands from command library 320. The user may compile the source code using compiler 340 to produce object code. The user may execute the object code to perform operations, such as data processing operations, in TCE 110 on computer 102.

Instrument 130 may run an instrument-based TCE in O/S 150 to perform operations on acquired data.

Figure 4:
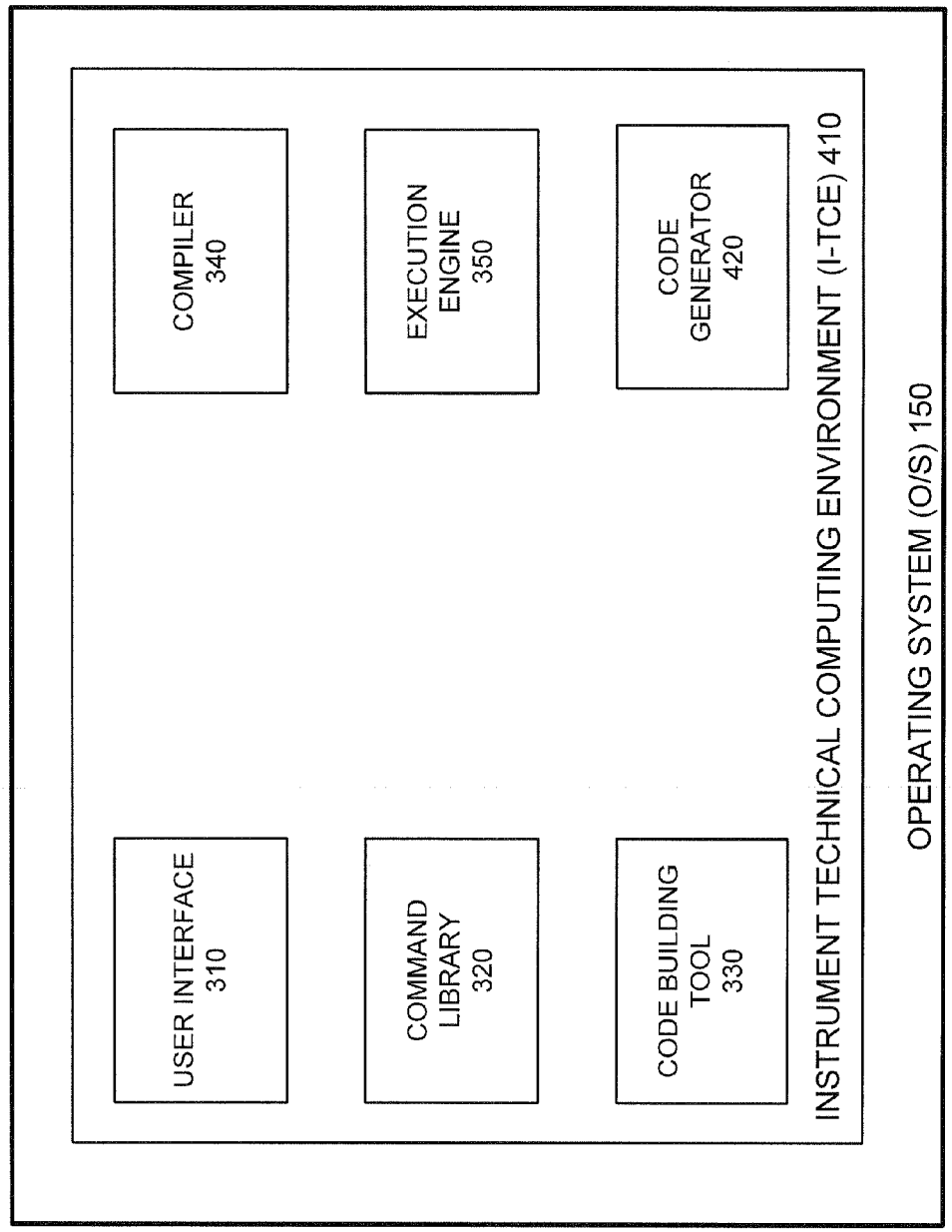
FIG. 4 illustrates an exemplary operating system that can be used on the instrument of FIG. 1.

FIG. 4 illustrates an exemplary embodiment of operating system 150 that can be used on the instrument of FIG. 1. O/S 150 can include instrument technical computing environment (I-TCE) 410, where I-TCE 410 can be used to develop, edit, execute, etc., algorithms that can process, display, or store acquired data.

Embodiments of I-TCE 410 may be the same as, or similar to, TCE 110 on computer 102 or they may differ from TCE 110. For example, I-TCE 410 may be smaller in size than TCE 110, and I-TCE 410 may include a subset of the functionality of TCE 110. In an embodiment, TCE 110 may include MATLAB technical computing software and TCE 410 may include embedded MATLAB technical computing software.

In an embodiment, I-TCE 410 may include user interface 310, command library 320, code building tool 330, compiler 340, and execution engine 350 that can be similar or identical to their counterparts in TCE 110. For example, when these components differ from their counterparts in TCE 110, user interface 310 may be modified to work with an integrated, such as display 135, instead of with an external display that may be attached to computer 102; command library 320 on I-TCE 410 may include fewer functions than command library 320 on TCE 110; etc.

I-TCE 410 may further include code generator 420 that can include logic to generate source code or executable code. For example, code generator 420 may receive executable code adapted to run on O/S 150 from compiler 340 on instrument 130. Code generator 420 may convert the received code into executable code that can run in a real-time environment, such as RTC 160. Continuing with the example, code generator 420 may convert instructions that implement an algorithm in a weakly typed language (e.g., I-TCE 410) into executable instructions that implement the algorithm in a strongly typed language (e.g., a language running in RTC 160). Code generator 420 may further perform optimizations when generating code. For example, RTC 160 may allow parallel processing of data whereas O/S 150 may only support serial processing of the data. Here, code generator 420 may perform optimizing operations that convert serial processing operations into parallel processing operations while code generator 420 is generating code for use in RTC 160.

Embodiments of code generator 420 may support generating code for a single platform, such as a single RTC 160 that includes a certain type of RT HW 170, or code generator 420 may support generating code for multiple platforms. For example, code generator 420 may include a user interface that allows a user to select a particular type of RT HW 170, such as types or models of FPGAs, digital signal processors (DSPs), application specific integrated circuits (ASICs), graphics processing units, etc. Code generator 420 may include logic that generates code that is appropriate for selected pieces of RT HW 170. When code generator 420 supports multiple types of RT HW 170, generated code can be configured to run on one piece of RT HW 170 at a time or to run on multiple pieces of RT HW 170 at a time.

Exemplary Real-Time Computer

Figure 5:
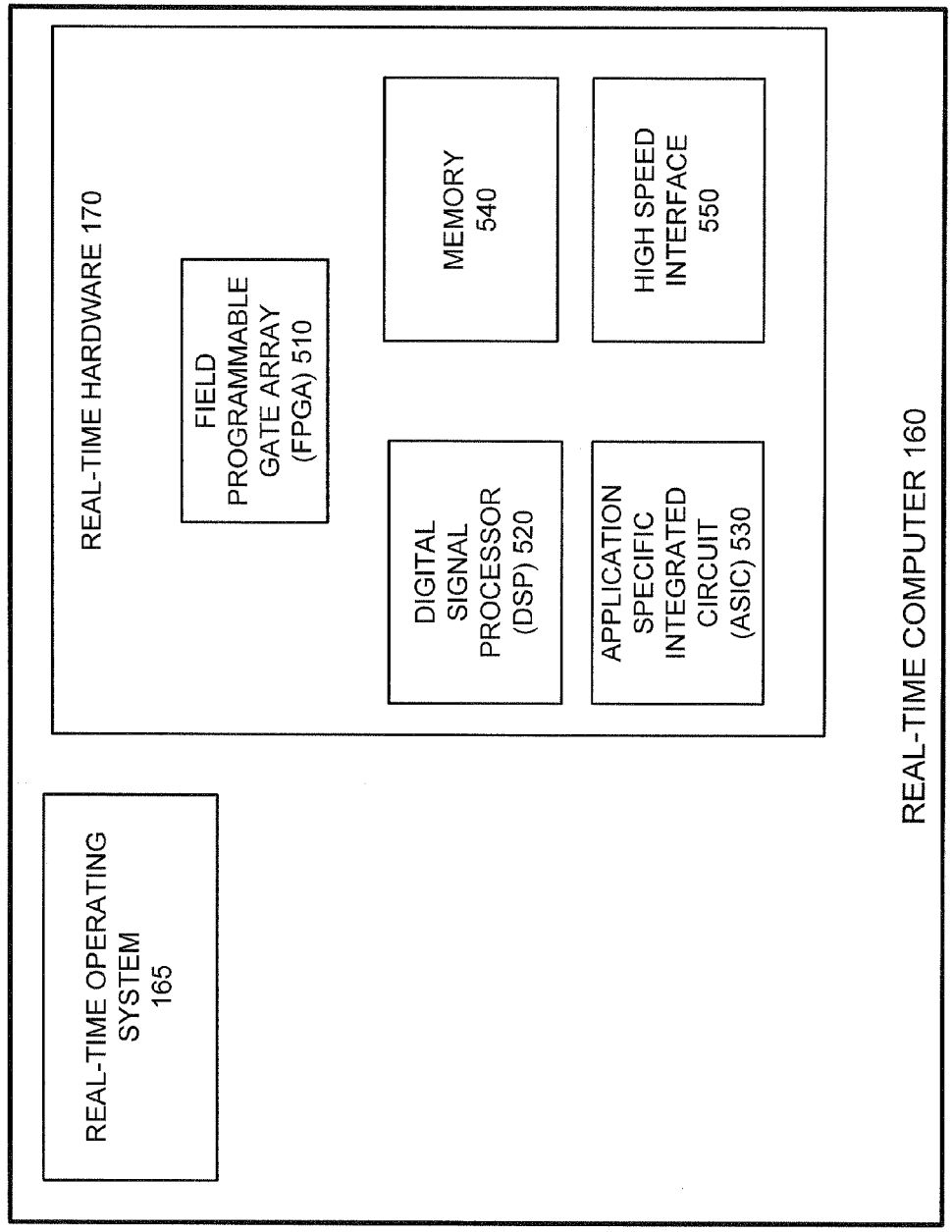
FIG. 5 illustrates an exemplary real-time computer that can be used in the instrument of FIG. 1.

FIG. 5 illustrates an exemplary real-time computer that can be used in the instrument of FIG. 1. In FIG. 5, the real-time computer can be implemented via RTC 160 and can include RT O/S 165 and RT HW 170. In the embodiment of FIG. 5, RT HW 170 can include FGPA 510, DSP 520, ASIC 530, memory 540 and high speed interface 550.

FPGA 510 may include programmable processing logic that executes instructions. Embodiments of FPGA 510 can include analog logic as well as digital logic. In an embodiment, FPGA 510 can include programmable logic blocks that can be programmed to perform functions, such as functions performed by logic gates. FPGA 510 may further include a hierarchy of programmable interconnects that can be used to interconnect the logic blocks as needed for a particular application. Embodiments of FPGA 510 may further support parallelized processing operations using the programmable logic blocks and programmable interconnects.

DSP 520 can include logic adapted for processing digital signals. In an embodiment, DSP 520 can include a specialized microprocessor that is adapted to perform digital signal processing operations on real-time data.

ASIC 530 can include customizable logic that executes instructions. In an embodiment, ASIC 530 may be a microprocessor that is customized for a particular application, such as processing digital signals in real-time.

Memory 540 may include logic that stores instructions and/or data in RTC 160. In an embodiment, memory 540 may be a high speed storage device as compared to a memory operating in a non-real-time portion of instrument 130. Memory 540 may store acquired data, interim results, final results, instructions, addresses, etc., that are used with RTC 160.

High speed interface 550 may include logic that communicatively couples FPGA 510, DSP 520, ASIC 530, and memory 540 together to facilitate real-time processing activities in instrument 130. High speed interface 550 may also interact with components and/or devices external to RTC 160, such as N-RTC 145 and/or I/O 175.

Exemplary User Interface

Figure 6:
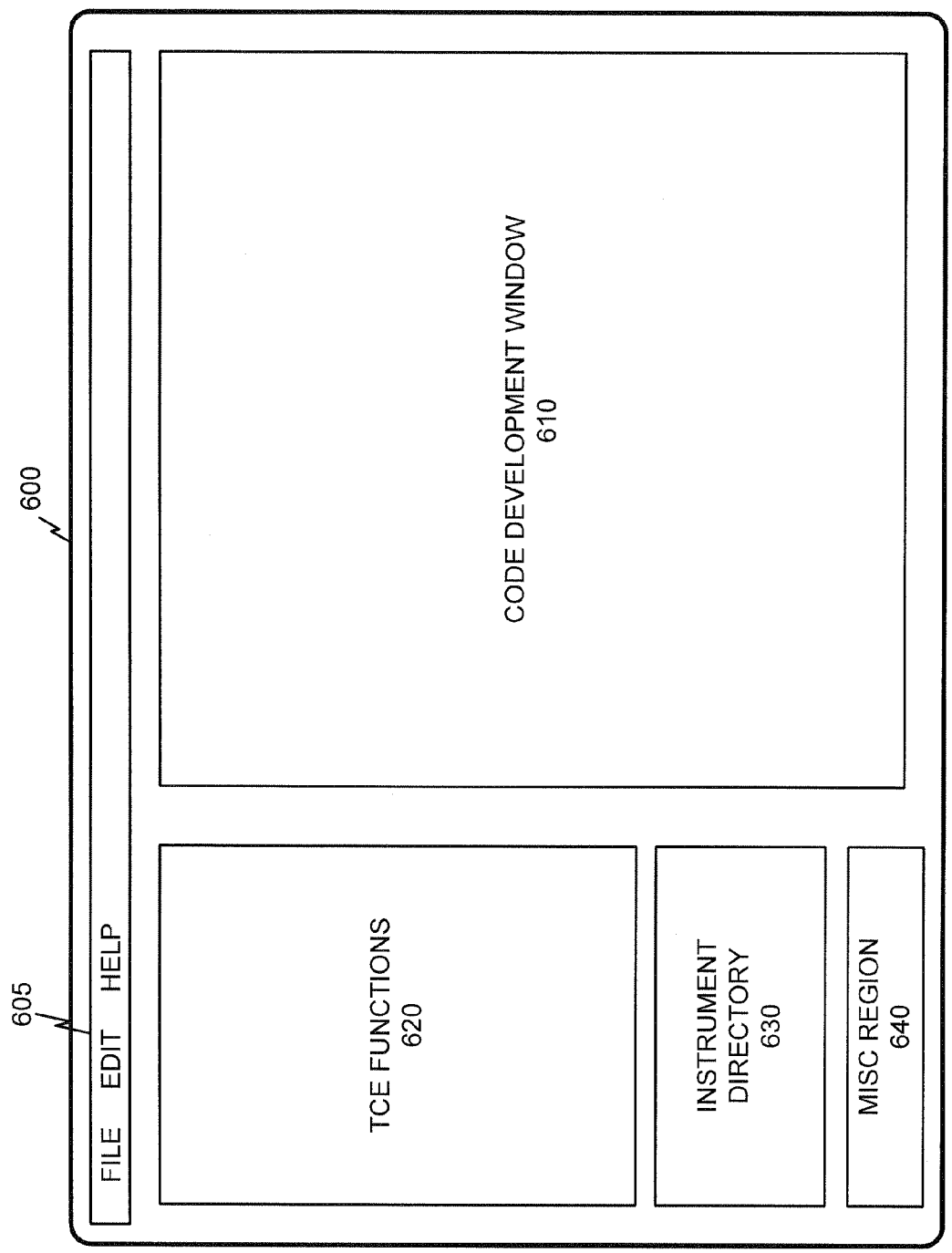
FIG. 6 illustrates an exemplary user interface that can be used to display information in an exemplary embodiment.

FIG. 6 illustrates an exemplary user interface 600 that can be used to display information in an exemplary embodiment. User interface 600 can be displayed on a display device in instrument 130 and/or computer 102. In an embodiment, user interface 600 may be displayed in a window of a display device. User interface 600 can include toolbar 605, code development window 610 (hereinafter window 610), TCE functions 620, instrument directory 630, and miscellaneous region 640.

Window 610 may include a region of user interface 600 in which a user develops code, such as source code. Window 610 may display text and/or graphics to the user. TCE functions 620 may include a portion of user interface 600 in which functions, operators, symbols, etc., are displayed to the user. For example, TCE functions 620 may include operators that can be applied to data files processed on computer 102. In addition, TCE functions 620 can include functions, such as signal processing functions, plotting functions, data handling functions, etc. In an embodiment, a user may drag an item from TCE functions 620 into window 610 and may drop the item in window 610. The user may utilize the dropped item as part of the code that is developed in user interface 600.

Instrument directory 630 may include a listing of information about instruments. For example, the listing may identify instruments that are available to the user, available to code developed in window 610, available to computer 102, etc. The listing may include instrument names, model numbers, designators (such as addresses, ID numbers, etc.), instrument processor types, etc. The user may select one or more items from the listing. The selected one or more items may communicate with user interface 600 once the user has made a selection. Miscellaneous region 640 may include a portion of user interface 600 that can include other information that can be used with an instrument, computer, developed code, etc.

Exemplary Sequence Diagram

Figure 7A:
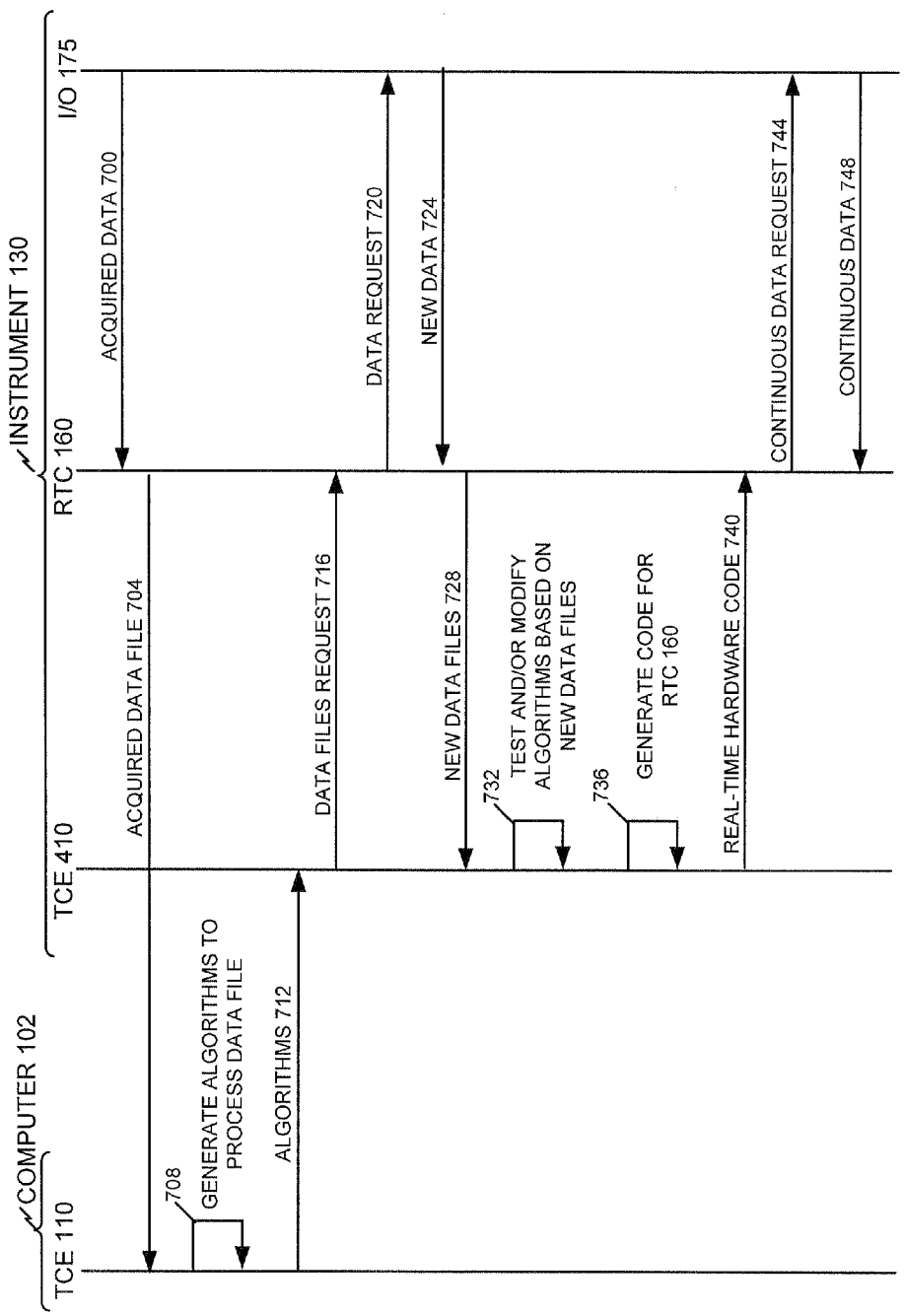
FIGS. 7A and 7B are sequence diagrams illustrating examples of messages and operations that can be used in an exemplary embodiment.
Figure 7B:
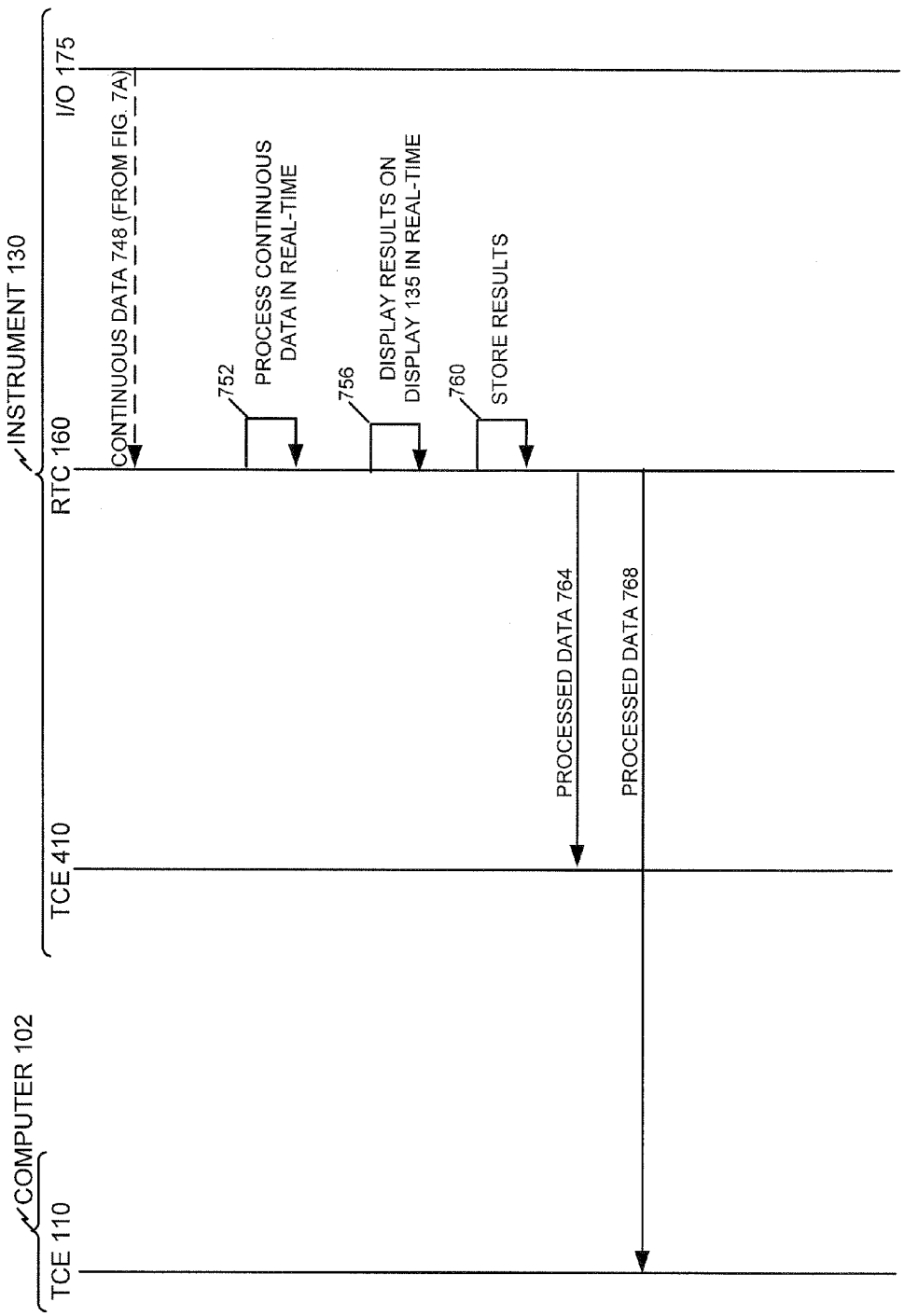

FIGS. 7A and 7B are sequence diagrams illustrating examples of messages and operations that can be used in an exemplary embodiment. The sequence diagrams of FIGS. 7A and 7B are exemplary and other embodiments may include more or fewer messages, operations, devices, etc., without departing from the spirit of the invention. FIGS. 7A and 7B can include TCE 110, I-TCE 410, RTC 160, and I/O 175.

I/O 175 may receive data, such as continuous data, from DUT 180. I/O 175 may sample the data using, for example, an analog-to-digital (A/D) converter. I/O 175 may send acquired data 700 to RTC 160. For example, I/O 175 may stream continuous samples of data to RTC 160.

RTC 160 may operate on acquired data 700 by, for example, segmenting the continuous data into one or more files that contain a portion of acquired data 700. RTC 160 may send an acquired data file 704 to TCE 110 on computer 102. A user may develop one or more algorithms to process acquired data file 704 using user interface 600 and TCE 110 (action 708). The user may debug the algorithms using a debugger and may display results produced algorithms are run against acquired data file 704. When the user is satisfied that the algorithms operate in a determined manner, the user may decide to send the algorithms to instrument 130.

TCE 110 may send algorithms 712 to TCE 410 that operates on instrument 130. For example, the user may send algorithms 712 to TCE 410 when the user is satisfied that algorithms 712 produce acceptable results when run against acquired data file 704. The user may interact with instrument 130 and TCE 410 to process other data files to further refine and/or develop algorithms 712. For example, the user may process data files that include a larger number of samples than the data files processed on computer 102.

TCE 410 may request additional data files from RTC 160. For example, TCE 410 may send data files request 716 to RTC 160 to request one or more data files. RTC 160 may retrieve data from memory 540 or RTC 160 may request additional data from I/O 175 to satisfy data files request 716. In FIG. 7A, RTC 160 may send data request 720 to I/O 175 to request new data that can be used with algorithms 712.

I/O 175 may send new data 724 to RTC 160, and RTC 160 may format new data 724 into one or more new data files 728. For example, new data files 728 may be larger than acquired data file 704 since N-RTC 145 may be capable of handling larger file sizes than computer 102. Also, file transfer delays between computer 102 and instrument 130 may not arise when new data files 728 are retained on instrument 130 instead of being sent to computer 102.

RTC 160 may send new data files 728 to TCE 410. TCE 410 may test or modify algorithms 712 based on results produced by running algorithms 712 against new data files 728 (action 732). When it is determined that algorithms 712 are satisfactory, e.g., when algorithms 712 produce determined results when run against new data files 728, TCE 410 may generate code for RTC 160 (action 736). In an embodiment, TCE 410 may generate code for RT HW 170 operating in RTC 160.

For example, TCE 410 may generate real-time hardware code (RT HW-code) 740. In an embodiment, TCE 410 may take byte level, weakly typed, technical computing code and may generate strongly typed binary code for use in RT HW 170. Binary code for use in RT HW 170 can take many forms depending on the type of device in RT HW 170 that will execute the instructions to perform real-time processing. For example, HDL code can be generated when FPGA 510 is used to perform real-time processing. The HDL code may be used directly or may be converted into another type of code, such as bit level code, that can be used for burning in an FPGA (i.e., actually setting bits in the device). Generating code using TCE 410 may further entail converting byte level code that performs serial processing into bit level code adapted to perform parallel processing in RT HW 170.

RTC 160 may send continuous data request 744 to I/O 175 to cause I/O 175 to acquire continuous real-time data from DUT 180. I/O 175 may acquire continuous real-time data from DUT 180 and may send continuous data 748 to RTC 160.

Referring now to FIG. 7B, RTC 160 may make continuous data 748 available to RT HW 170, where RTHW 170 may process continuous data 748 in real-time using, for example, FPGA 510 (action 752). In an embodiment, FPGA 510 may parallelize processing of continuous data 748 and this parallelized processing may allow FPGA 510 to process the data in real-time. FPGA 510 may produce a real-time result when continuous data 748 is processed. In an embodiment, FPGA 510 may continuously produce real-time results while continuous data 748 is present. FPGA 510 may make real-time results available to RTC 160 (e.g., by making the results available to RT O/S 165).

For example, RTC 160 may display the real-time results on display 135 in real-time (action 756). In an embodiment, results shown on display 135 may change in real-time as continuous data 748 changes. RTC 160 may further store results produced by FPGA 510 in memory (action 760). In an embodiment, the memory may be fast enough to continuously store real-time results when FPGA 510 is processing continuous data 748.

RTC 160 may send processed data 764 to TCE 410 so that processed data 764 can be evaluated in non-real-time using TCE 410. For example, a user may wish to periodically check results produced in real-time on RTC 160 to determine that the results are satisfactory. RTC 160 may also send processed data 768 to TCE 110 operating on computer 102. For example, processed data 768 may be used to refine existing processing algorithms or for developing new processing algorithms on computer 102.

EXAMPLES

Exemplary embodiments allow a user to implement algorithms on one or more real-time processing devices, such as FPGAs, DSPs, ASICs, etc. Since the user can write an algorithm and generate executable real-time code for the algorithm, the user can be confident that he will get the same answer from a first instrument using a first real-time processing device and from a second instrument using a different type or model of a real-time processing device when the first and second instruments receive the same input data.

In contrast, known instruments may not give the user the same result when the same data is input into two instruments that use different types, or models, of real-time processing devices.

By way of example, a user may wish to compute the rise time for a signal according to an industry standard, such as the Institute of Electrical and Electronic Engineers (IEEE) Standard 181, entitled IEEE Standard on Transitions, Pulses and Related Waveforms. IEEE Standard 181 specifies several acceptable techniques for calculating the rise time of a waveform. A first instrument vendor may use one of the acceptable techniques and may claim that its instrument computes rise times in accordance with IEEE Standard 181. Additionally, a second instrument vendor may use a different one of the acceptable techniques to compute rise times, also in accordance with IEEE Standard 181, and may claim that its instrument computes rise times in accordance with IEEE Standard 181.

Users performing rise time measurements on the same input signal using the first instrument (and first technique) and the second instrument (and the second technique) may get different answers. Since most users assume that a compliant test technique always produces the correct answer, users rarely investigate to determine if a standard allows for multiple techniques and whether the different techniques produce different answers. Obtaining different answers for measurements performed on the same input signal may lead users to assume that their signal transmitter or receiver is malfunctioning, that an unknown source of interference is present, etc., when nothing may be wrong with the user's system or testing environment.

Figure 8A:
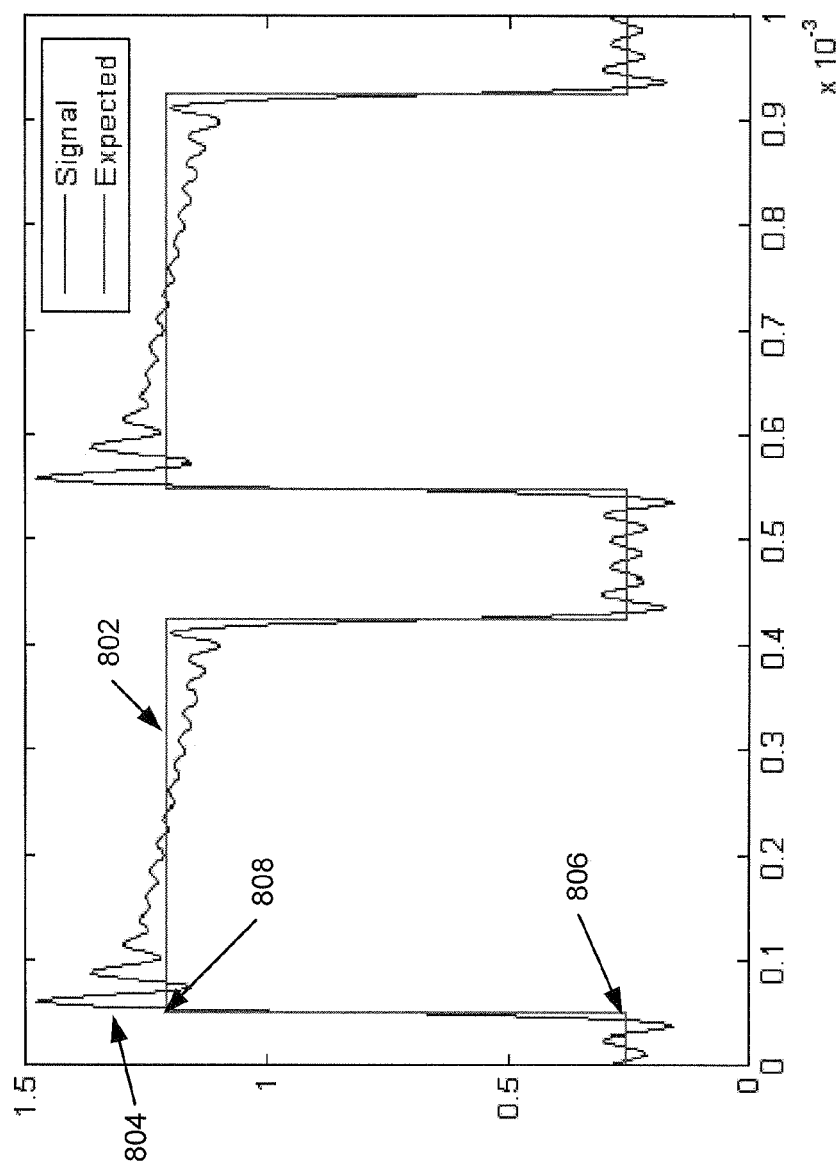
FIGS. 8A-8G illustrate exemplary traces that can be produced by applying an industry standard measurement technique to an input signal.

FIGS. 8A-8G include exemplary traces showing IEEE Standard 181 measurement techniques applied to an input signal. In FIG. 8A, ideal signal 802 may indicate the shape, duration, minimum value, and/or maximum value of a theoretical signal. For example, ideal signal 802 may have a rise time that is instantaneous and against which an actual rise time for a received signal is compared. For example, rise time may be defined as the time required for a signal to transition from a first value (e.g., a minimum value or a first state) to a second value (e.g., a maximum value or a second state), where an ideal signal makes the transition instantaneously (i.e., the time for the transition is essentially zero time units, such as micro-seconds).

Ideal signal 802 may have a first state 806 that represents a minimum value and a second state 808 that represents a maximum value. Actual signal 804 may be characterized in regions where ideal signal 802 transitions from first state 806 to second state 808, and this characterization may be used to determine the rise time for actual signal 804.

Rise time measurements may be made for actual signal 804 in a region around where ideal signal 802 transitions from its minimum value to its maximum value. In IEEE Standard 181 a number of different techniques can be used to make this rise time measurement. FIGS. 8B-8G illustrate some of these techniques.

Figure 8B:
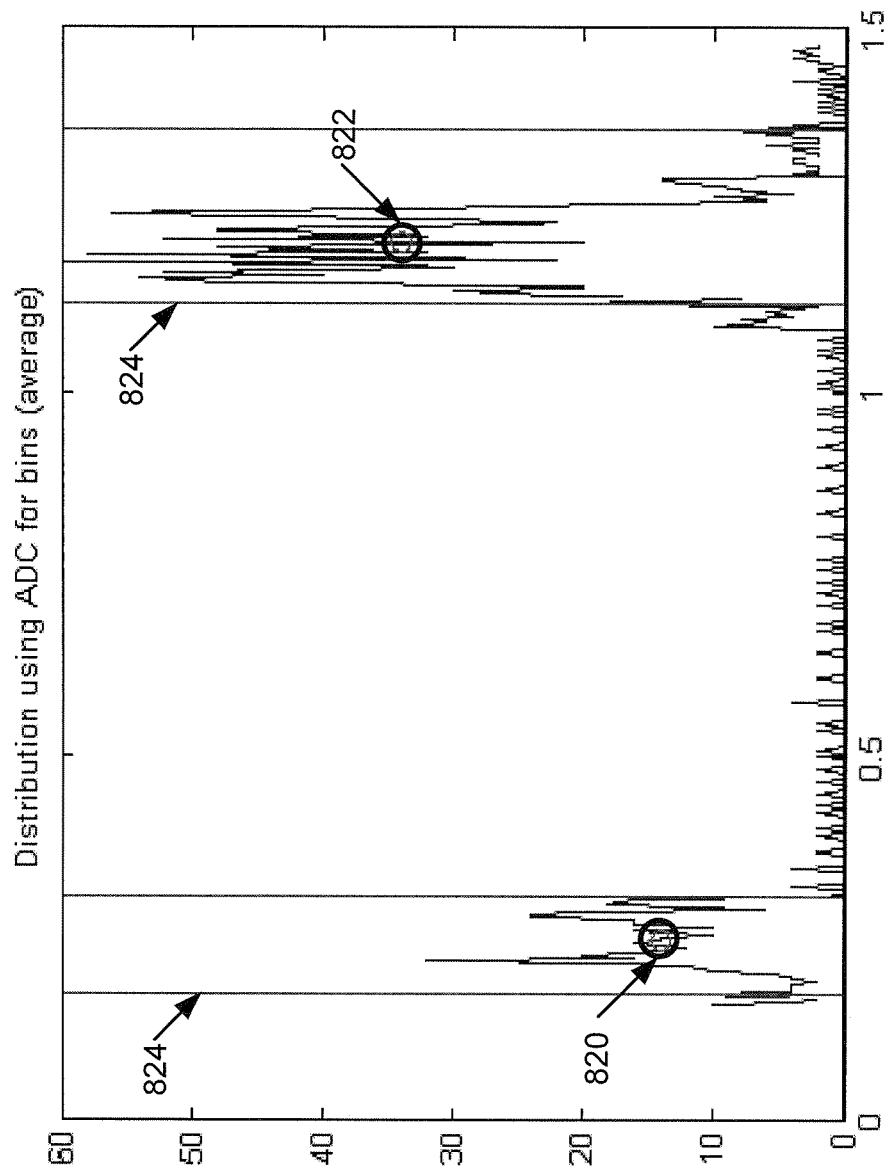

FIG. 8B illustrates a technique that employs a distribution that uses analog-to-digital converter (ADC) bins and takes an average of the distribution of these bins. For example, an ADC may quantize information into bins as when actual signal 804 is sampled. In the technique of FIG. 8B, a fixed value for the number of bins may be selected. For example, the number of bins may be selected based on observation or common practice.

In FIG. 8B, the amplitude of actual signal 804 is plotted along the x-axis and the number of bins is plotted along the y-axis. In FIG. 8B, identifiers, such as bar pairs 824, can be used to identify portions of the display, such as to show bimodal portions of actual signal 804. A lower average 820 is indicated via a circle and represents the average of the number of bins in a region around first state 806. An upper average 822 is indicated via a circle and represents the average of the number of bins in a region around second state 808.

Figure 8C:
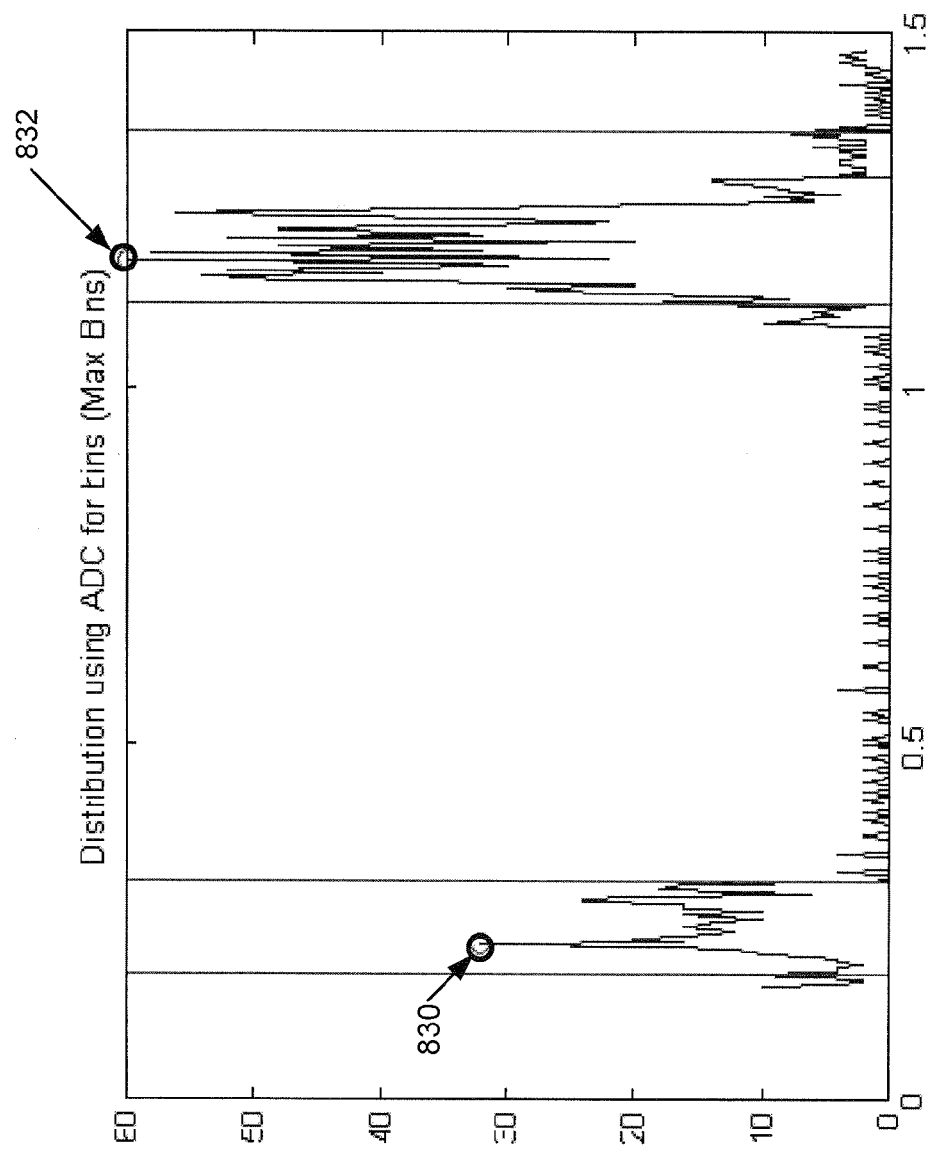

FIG. 8C illustrates a technique that uses a distribution for ADC bins and that takes a maximum for the distribution in a region around first state 806 and second state 808.

Figure 8D:
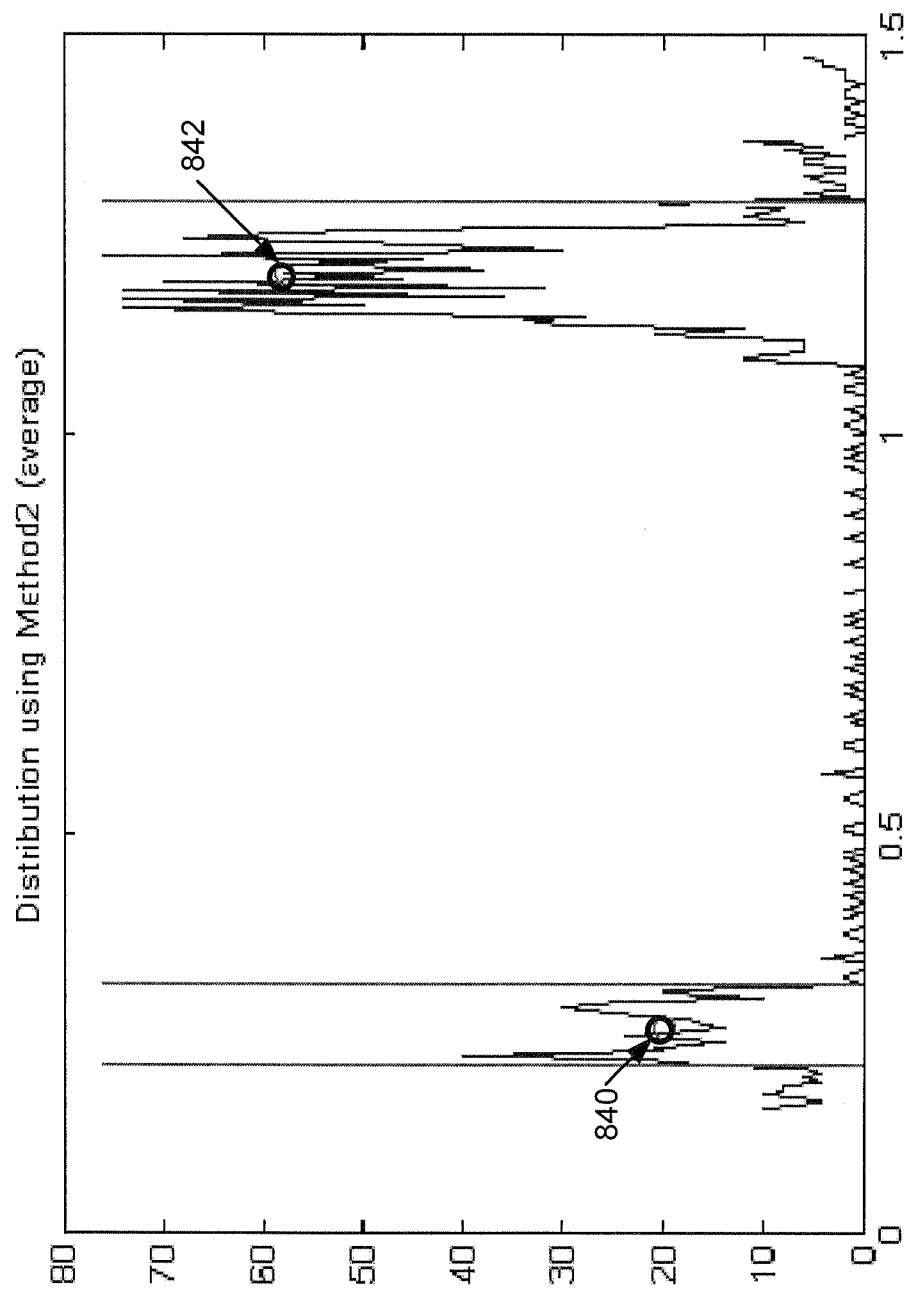

FIG. 8D illustrates a technique that uses a distribution in which the number of bins are changed until a histogram criteria is obtained. For example, the number of bins may be incremented until one percent of the bins are within actual signal 804. In FIG. 8D, an average is taken for the distribution and a lower average 840 is indicated via a circle in a region around first state 806 and an upper average 842 is indicated via a circle in a region around second state 808.

Figure 8E:
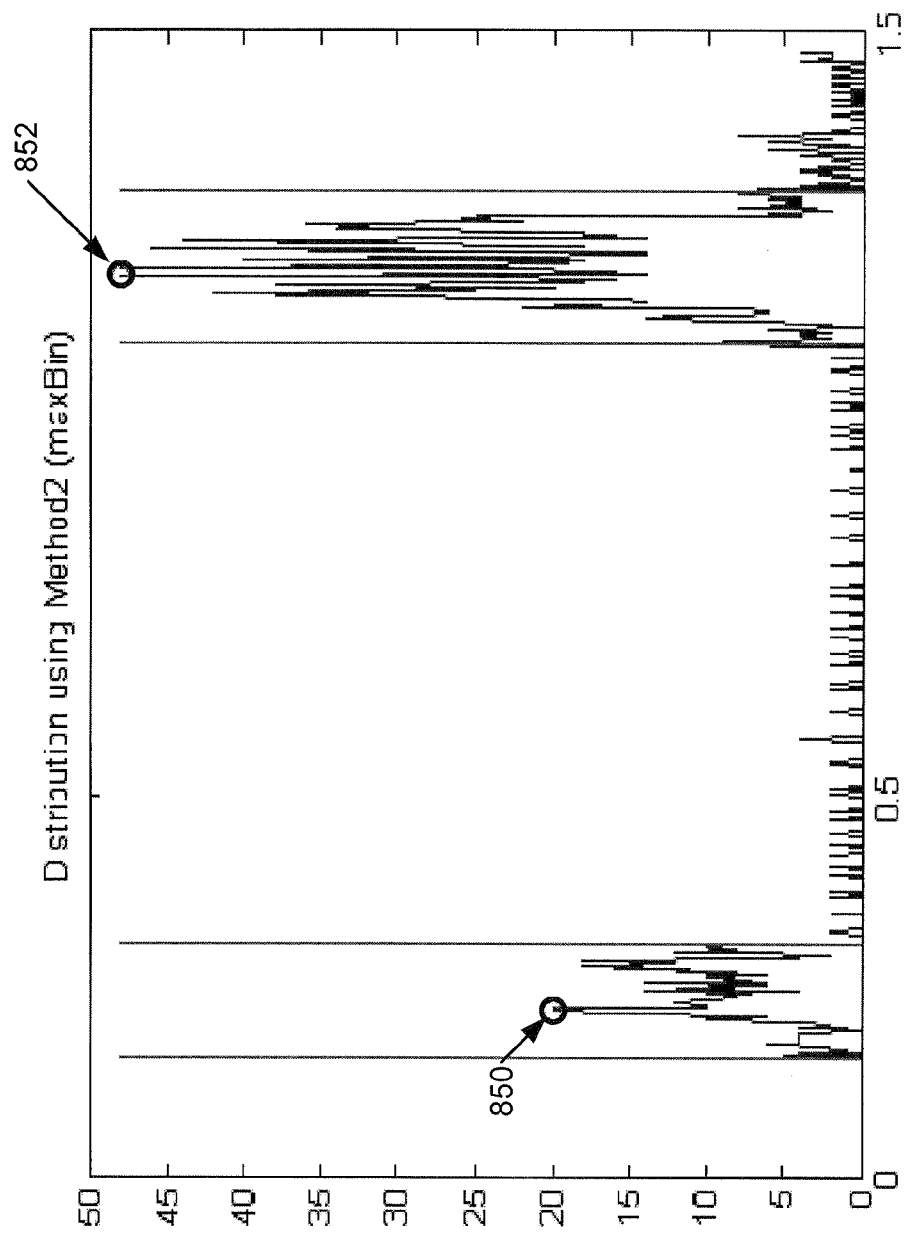

FIG. 8E illustrates a technique that uses the distribution of FIG. 8D but that takes the maximum of the bin values instead of the average (as was done in FIG. 8D). A lower maximum 850 is indicated via a circle in a region around first state 806 and an upper maximum 852 is indicated in a region around second state 808.

Figure 8F:
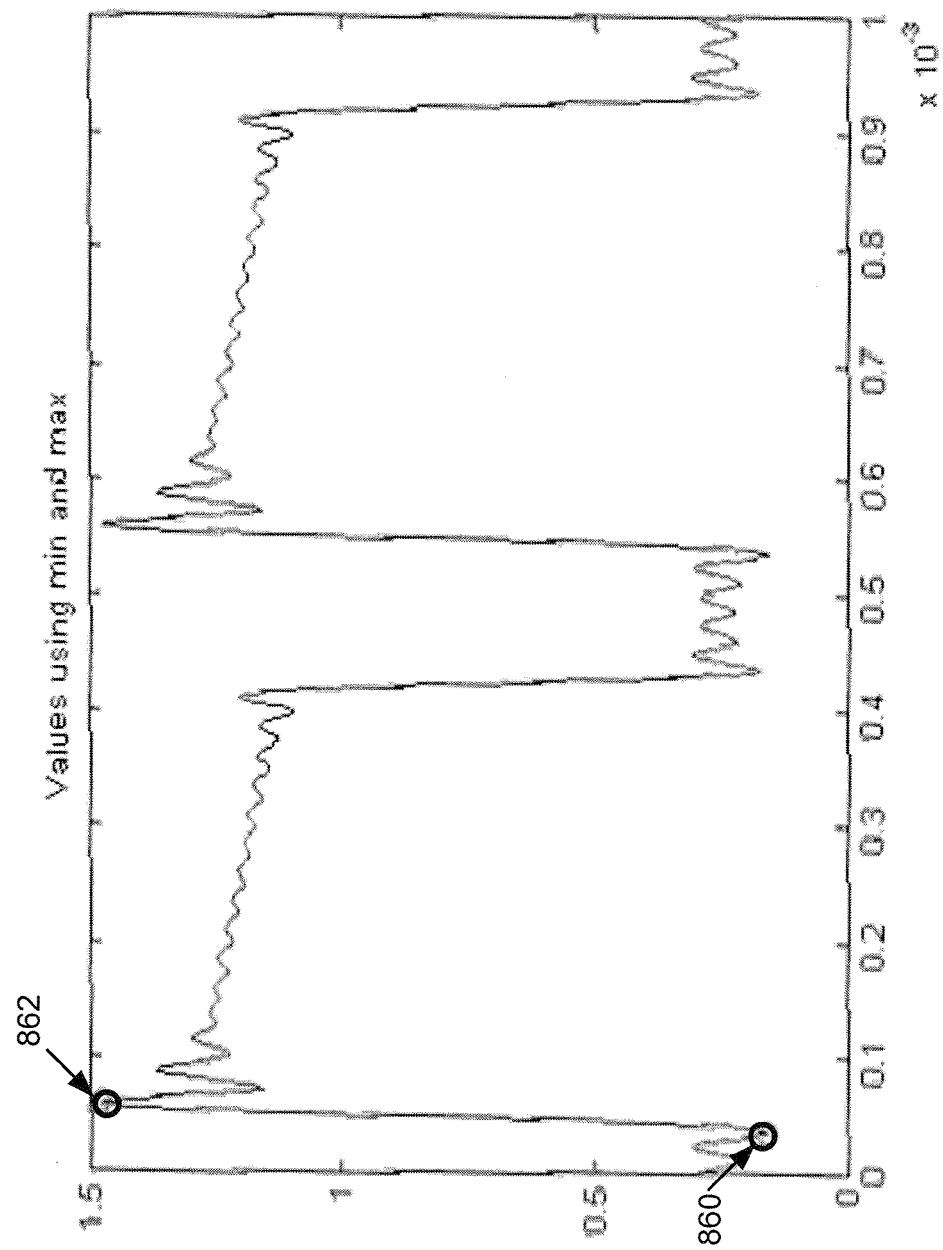

FIG. 8F illustrates a technique that takes a minimum value 860 and a maximum value 862 for actual signal 804. The technique of FIG. 8F may not use bins to represent information associated with actual signal 804.

Figure 8G:
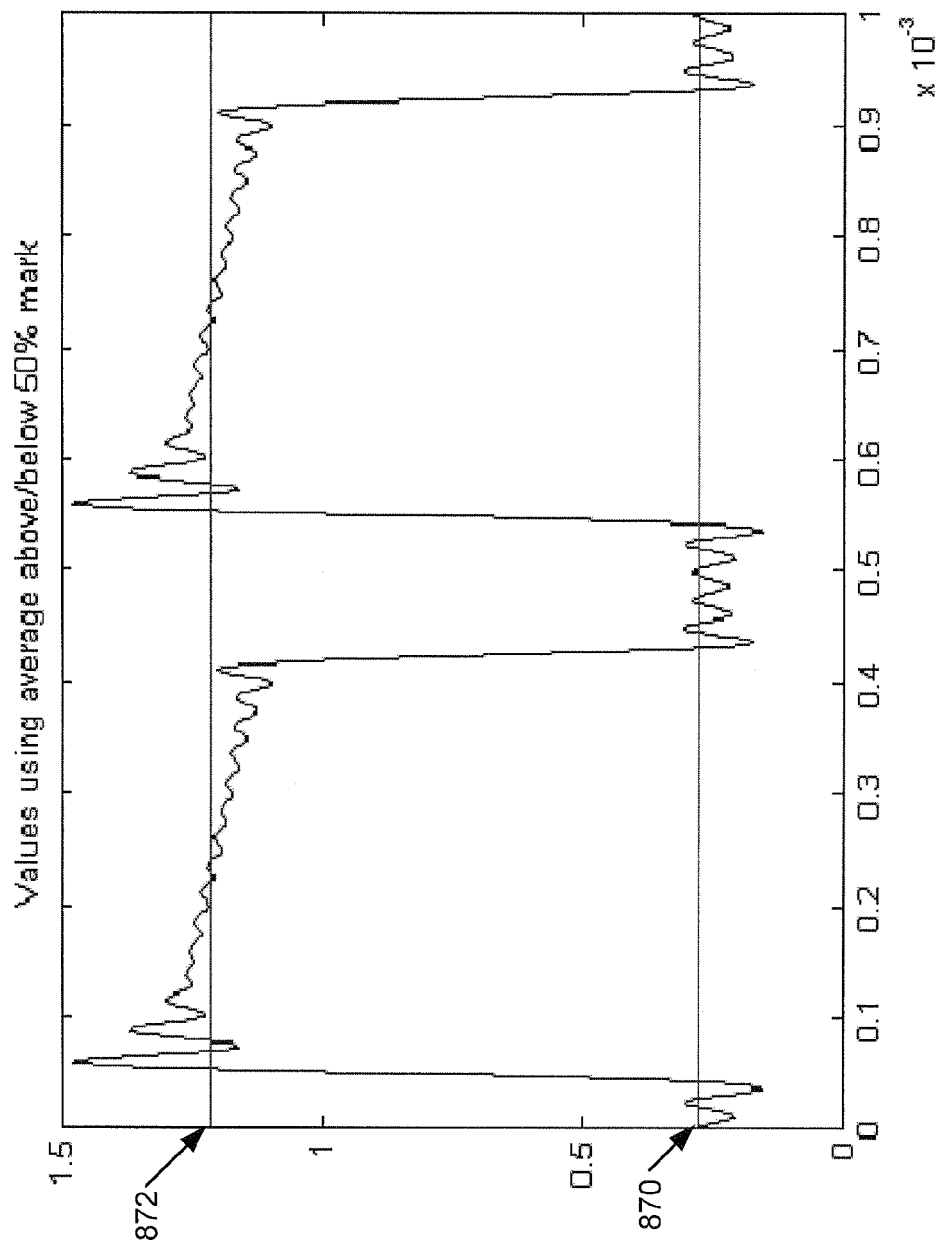

FIG. 8G illustrates a technique that uses an average taken above and below a 50% mark for actual signal 804. A lower value 870 and an upper value 872 of this measurement can be represented via horizontal lines.

FIG. 8H illustrates a plot that includes the lower and upper measurement results for the techniques illustrated in FIGS. 8B-8G. In FIG. 8H it can be observed that the discussed techniques, which are all IEEE Standard 181 compliant, can produce different results for lower values 882 and/or the upper values 884 when one technique is compared against another technique using the same input signal (e.g., signal 804). For example, the lower value for the technique of FIG. 8B (labeled ADC1 in FIG. 8H) differs from the lower value produced by the technique of FIG. 8D (labeled M2_1 in FIG. 8H). If all of the techniques produced the same lower values 882 and upper values 884, then all lower values 882 would fall on line 886 and all upper values 884 would fall on line 888.

Exemplary embodiments disclosed herein allow a user to select one or more of the IEEE Standard 181 compliant techniques, encode the technique into an algorithm in a high level language within a TCE, and then generate lower level executable code for the algorithm that can be implemented in any of a number of types and/or models of real-time processing devices, such as FPGAs, DSP, ASICS, etc. Exemplary embodiments allow the user to get the same result for an actual signal using a first instrument running a first type of FPGA (e.g., a Xylinx FPGA) and from a second instrument running a second type of FPGA (e.g., a QuickLogic FPGA).

Exemplary embodiments may further allow a user to configure a first type of instrument to behave like a second type of instrument. For example, a spectrum analyzer may be a type of instrument that is configured to capture and analyze narrow band signals and an oscilloscope may be an instrument that is configured to analyze wide band signals (i.e., signals having a large bandwidth).

Known instruments and known techniques may not let a user configure a spectrum analyzer to behave more like an oscilloscope. Exemplary embodiments may allow the user to reconfigure the spectrum analyzer to behave more like an oscilloscope. For example, the user can write algorithms for processing broadband signals in a high level language in a TCE. The user can generate low level executable code for the algorithms where the low level code is adapted to run on an FPGA installed in the spectrum analyzer. The user may run the spectrum analyzer and may acquire broadband signals. The user may process the acquired broadband signals using the algorithms ported to the FPGA.

Exemplary embodiments may further allow users to generate and display plots on instruments where the plots are not types generally available on instruments. For example, a user may wish to display a scatter plot on an instrument, where a scatter plot may not be a plot type that can be displayed on known instruments. The user may write code for generating a scatter plot from received symbols, e.g., symbols used in a quadrature amplitude modulated (QAM) signal used in a wireless communication system.

Figure 9:
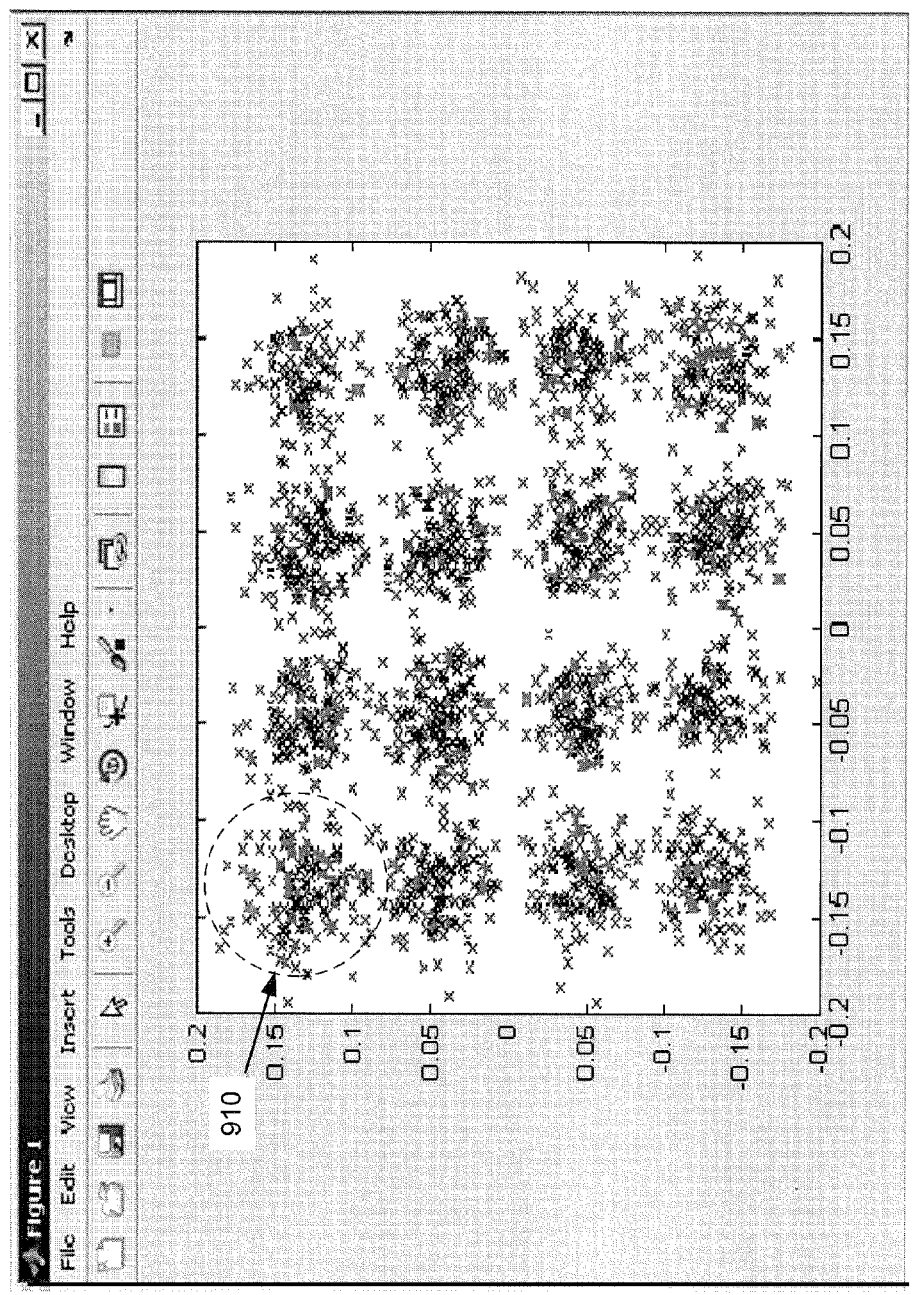
FIG. 9 illustrates an exemplary scatter plot that can be produced using an exemplary embodiment.

The user may port the code from a TCE to an FPGA that runs in the instrument using a code generator. The user may then acquire QAM data, process the acquired data, and generate a scatter plot, such as the plot illustrated in FIG. 9. The user may use the displayed information to make determinations about the performance of the wireless communication system.

For example, the user may determine whether a grouping of symbols, such as grouping 910, are of an adequate density. For example, if a small number of symbols are outside the dashed circle of FIG. 9, the user may be satisfied with the performance of a receiver that received the QAM signal. In contrast, if the user determines that a large number of symbols for grouping 910 are outside the dashed circle, the user may determine that a receiver is not properly tuned to receive the transmitted QAM waveform.

Figure 10A:
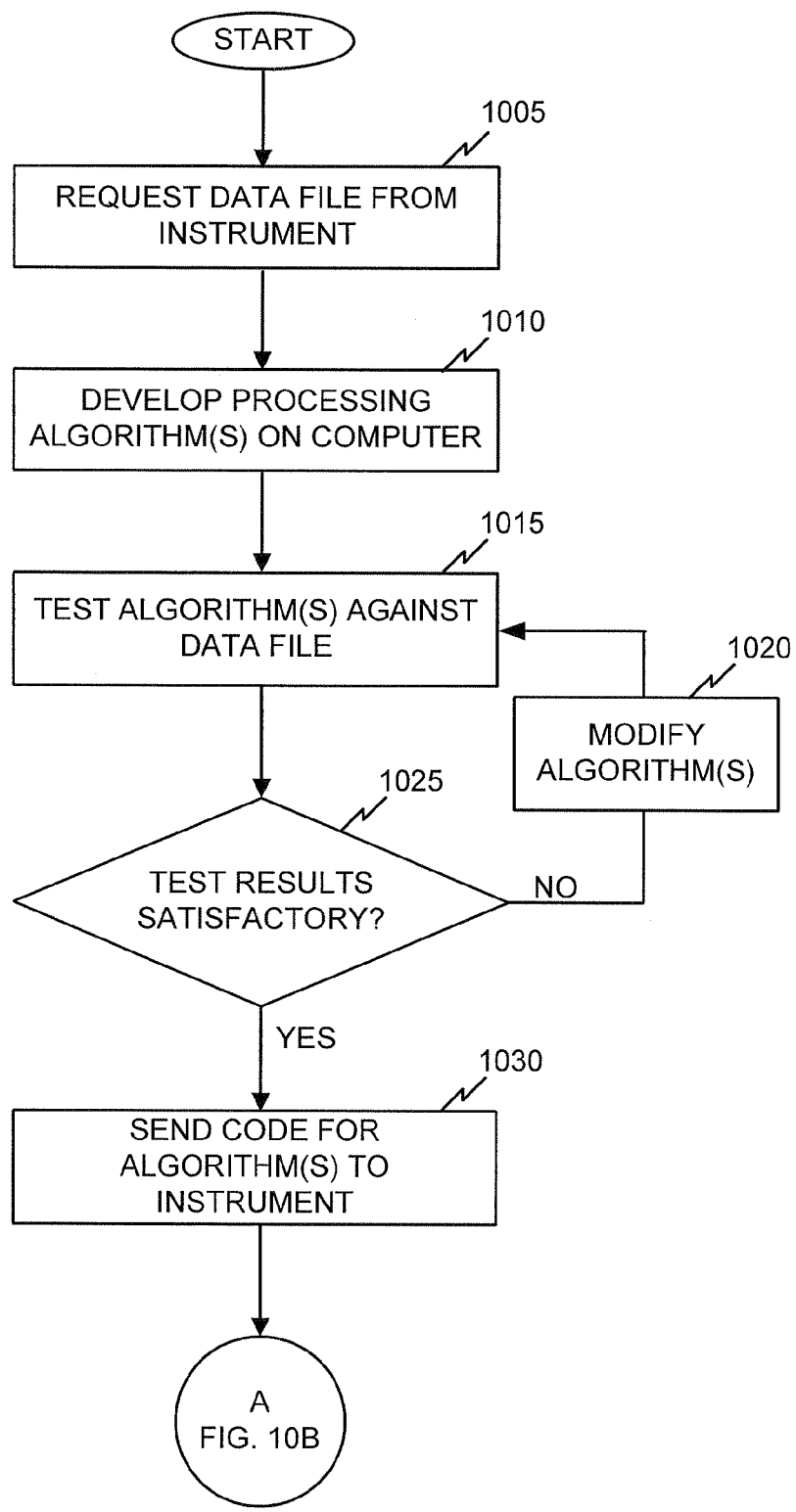
FIGS. 10A-10C illustrate exemplary processing that can be performed using an exemplary embodiment.
Figure 10B:
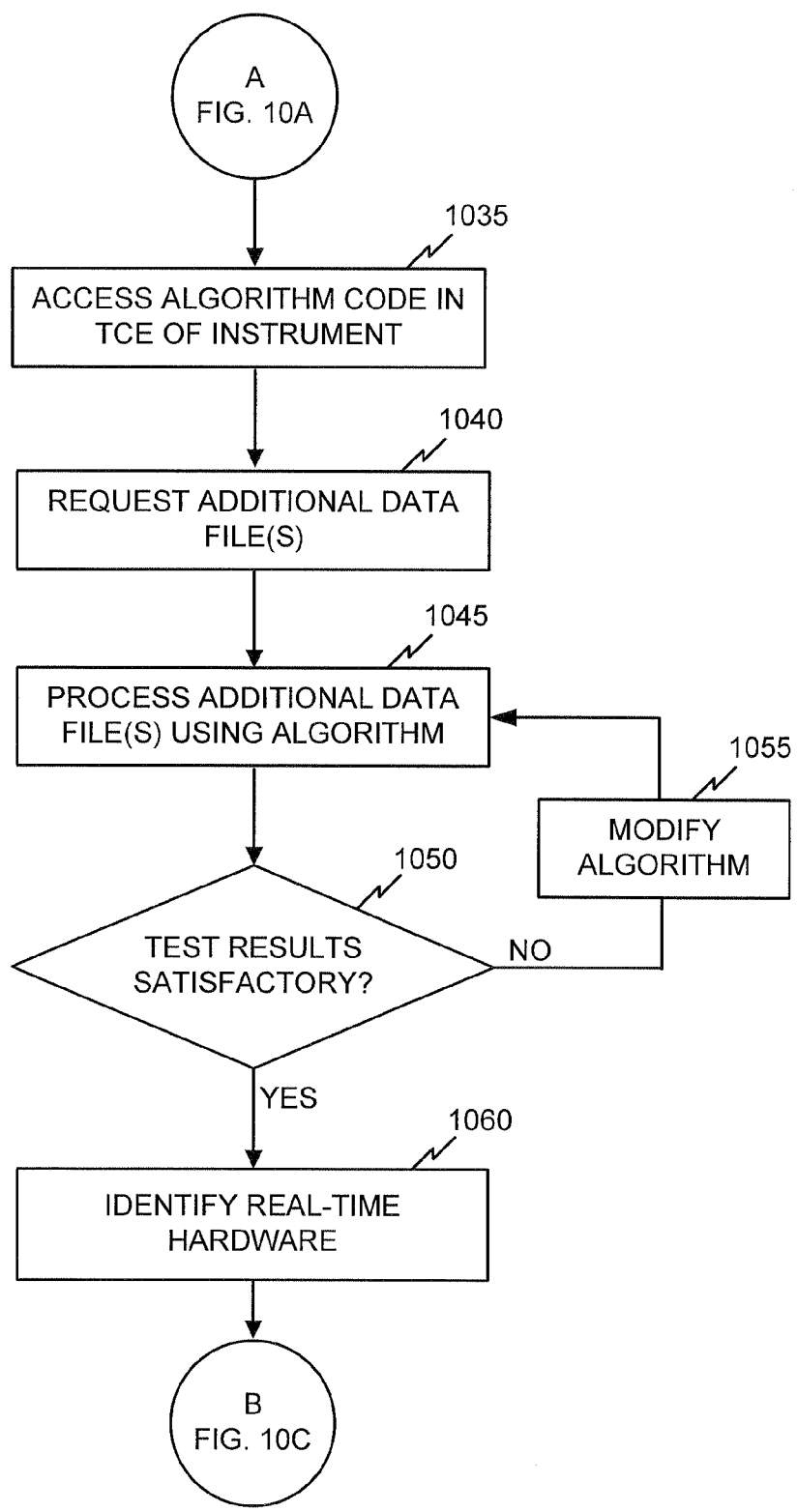
Figure 10C:
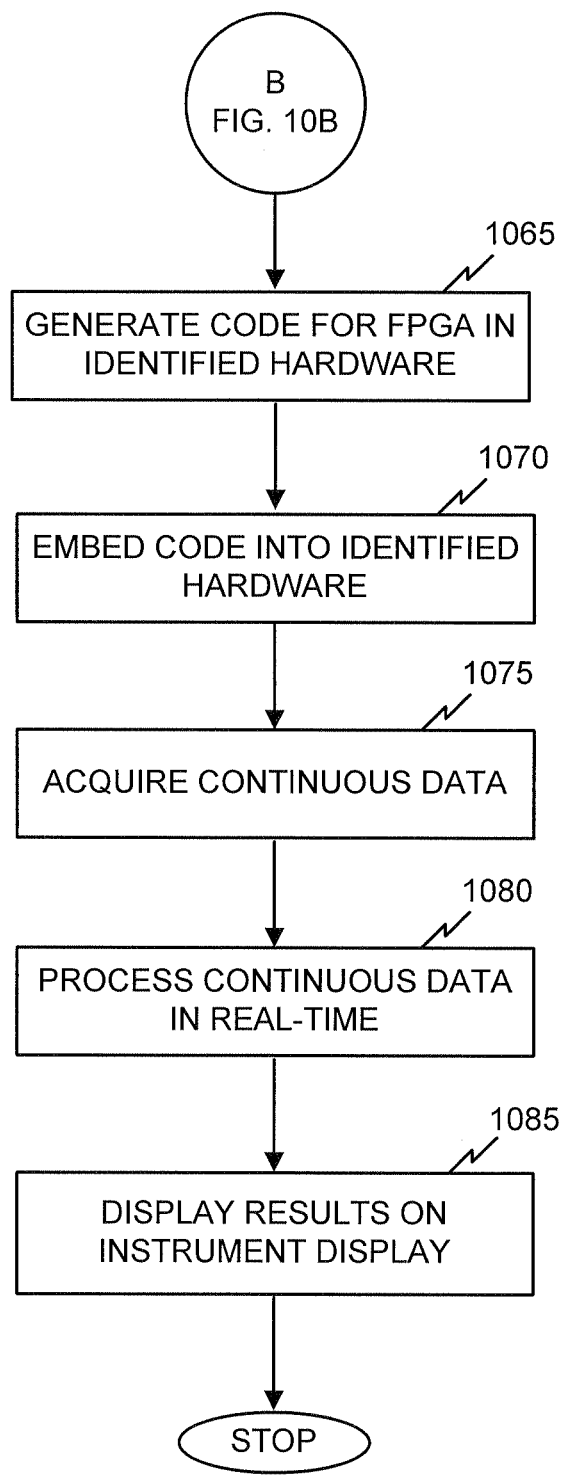

FIGS. 10A-C illustrate exemplary processing that can be used to practice an embodiment. A data file may be requested from instrument 130 (act 1005). For example, a user may issue a request to instrument 130 from computer 102. Instrument 130 may send acquired data file 704 to computer 102 in response to the request. The user may develop algorithms in TCE 110 on computer 102, where the algorithms are used to process acquired data file 704 (act 1010). The user may test the developed algorithms using acquired data file 704 (act 1015). For example, acquired data file 704 may include a data segment that is small enough so as to not exceed a width appropriate for O/S 105. For example, O/S 105 may be a 32 bit operating system that can handle file sizes that do not exceed 1 gigabyte (1 Gbyte) in size. In an exemplary application, 1 Gbyte of data may represent only a fraction of a seconds worth of data. This small data segment may be sufficient to perform initial testing on the developed algorithms; however, this data segment may be inadequate to completely test the developed algorithms.

The user, or computer 102, may determine whether test results obtained by running the developed algorithms against acquired data file 704 are acceptable (1025). If the test results are not satisfactory, the user may modify one or more of the algorithms (act 1020). After act 1020, the user may re-test the developed algorithms in act 1015 and may proceed back to act 1025.

When it is determined that the test results are satisfactory, code for the developed algorithms may be sent to instrument 1030 as algorithms 712 (act 1030). For example, algorithms 712 may be sent to instrument 130 via a wired or wireless link that directly couples computer 102 to instrument 130 or that indirectly couples computer 102 to instrument 130 (e.g., when a wired or wireless network is present).

Now referring to FIG. 10B, the code for the developed algorithms may be accessed via TCE 410 in instrument 130 (act 1035). The user may wish to perform additional processing additional of non-real-time data using instrument 130. For example, the user may wish to better determine whether the developed algorithms can be used to process real-time data acquired via instrument 130.

TCE 410 can request additional data files by sending data files request 716 to RTC 160 (act 1040). RTC 160 may provide new data files 728 to TCE 410 and the user may process the additional data files using the developed algorithms (act 1045). The user, or instrument 130, may determine whether the test results produced with the developed algorithms are satisfactory (act 1050). When it is determined that the test results are not satisfactory in act 1050, the user may modify the developed algorithms (act 1055) and may re-process the data files (act 1045). When the user modifies developed algorithms, the user may continue to work in a high level programming environment (e.g., TCE 410). Working in the high level environment may allow the user to continue using code that is intuitive to represent algorithms. The high level environment may further include robust debugging utilities to aid the user in diagnosing problems with the algorithms.

When test results are determined to be satisfactory in act 1050, real-time hardware may be identified (act 1060). For example, the user may interact with a graphical user interface on instrument 130 and may select real-time processing hardware installed in instrument 130. Examples of real-time hardware that can be installed in instrument 130 are, but are not limited to, FPGA 510, DSP 520, and ASIC 530.

Now referring to FIG. 10C, executable code may be generated for the identified piece of real-time hardware (act 1065). For example, the user may specify that he wants to generate executable bit code for a Xylinx FPGA that is installed in instrument 130. The user may interact with code generator 420, and code generator 420 may read in source code from TCE 410 and may generate the executable bit code.

For example, TCE 410 may read source code that implements the developed algorithms. Embodiments of code generator 420 may optimize the generated code when desired. For example, code generator 420 may optimize the generated code for parallel execution on the FPGA since the FPGA can support parallelized processing operations.

The generated code may be embedded into the identified real-time processing hardware (act 1070). Exemplary embodiments may allow the user to embed executable generated code into a device, such as an FPGA, without having to manually convert (e.g., by hand coding) the high level source code from TCE 410 into lower level bit code for the FPGA.

Instrument 130 can acquire continuous data once the developed algorithms are embedded into the real-time processing device (act 1075). Instrument 130 can further process the continuous data in real-time using the algorithms embedded into the real-time processing device (act 1080). Results of the real-time processing can be displayed on display 135 (act 1085), sent to a destination, stored in storage logic, etc.

Additional Exemplary Embodiments

An embodiment may implement TCE 110 and/or TCE 410 in a dynamically typed language that uses an array as a basic data type. Examples of some text-based TCE's that can be used to practice embodiments of the invention are, but are not limited to, MATLAB® software by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Another embodiment may be used to generate executable code for execution in an embedded system, such as a controller. For example, one or more algorithms can be tested in a non-real-time portion of instrument 130. These tested algorithms can then be implemented in a real-time portion of instrument 130 and tested against real-time data. Once it is determined that the algorithms are acceptable for a real-time application, instrument 130 can generate executable code for embedding into a controller that can be used, for example, in an automobile, a factory automation controller, a device controller, etc. The controller can then be used in real-time control applications to achieve desired outcomes.

Another embodiment may be implemented using a graphically-based TCE for TCE 110 and/or TCE 410. For example, TCE 110 and/or 410 can be implemented using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; or aspects of a Unified Modeling Language (UML) or SysML environment.

Another embodiment may be implemented in a language that is compatible with a product that includes a TCE, such as one or more of the above identified text-based or graphically-based TCE's. For example, a MATLAB application (a text-based TCE) may use a first command to represent an array of data and a second command to transpose the array. Another product, that may or may not include a TCE, may be MATLAB-compatible and may be able to use the array command, the array transpose command, or other MATLAB commands.

Another embodiment may be implemented in a hybrid TCE that combines features of a text-based and graphically-based TCE. In one implementation, one TCE may operate on top of the other TCE. For example, a text-based TCE (e.g., a MATLAB application) may operate as a foundation and a graphically-based TCE (e.g., a Simulink application) may operate on top of the MATLAB application and may take advantage of text-based features (e.g., commands) to provide a user with a graphical user interface and graphical outputs (e.g., graphical displays for data, dashboards to monitor processing activities, etc.).

Another embodiment may produce real-time executable code using TCE 410 that is configured to be consumed (e.g., used) on instrument 130 and/or a device that is remote with respect to instrument 130. For example, instrument 130 may be connected to computer 102 and to a remote device that includes additional specialized processing devices for performing real-time processing. Instrument 130 may generate executable code for real-time processing devices installed on instrument 130 and for the specialized processing devices installed on the remote device. When real-time data is processed using instrument 130, the real-time processing device in instrument 130 and the remote specialized processing devices may be used to process the real-time data.

Still other embodiments are possible consistent with the spirit of the invention.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include, but are not limited to, storage operations, transmission operations (e.g., sending information or receiving information), display operations, displacement operations, etc. Tangible and/or useful results may include still other activities, operations, etc., without departing from the spirit of the invention.

CONCLUSION

Implementations may allow technical computing code to be embedded in instruments to facilitate real-time processing on acquired data without requiring that the technical computing code be manually coded into a real-time portion of the instrument.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 10A-10C, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 2 and 5 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

The scope of the invention is defined by the claims and their equivalents.

What is claimed is:

1. One or more non-transitory computer-readable media storing executable instructions that when executed by processing logic process input data, the media storing one or more instructions for:
   receiving, at an instrument, executable code from a remote computer, the executable code developed in a first code development environment operating on the remote computer, the first code development environment including a set of functions;
   processing data captured at the instrument using the executable code, the processing performed in a second code development environment operating on the instrument, the second code development environment including a subset of the functions included in the first code development environment operating on the remote computer, the captured data processed by the instrument in non-real-time, the processing of the captured data at the instrument producing a result;
   translating, by a code generator of the instrument, the executable code from a first format that is compatible with the second code development environment operating on the instrument into a second format adapted for execution by a specialized processing device, the translating performed when the result produced by processing the captured data at the instrument is satisfactory;
   configuring the specialized processing device with the second format of the executable code; and
   processing the input data in real-time using the specialized processing device configured with the second format of the executable code.

2. The media of claim 1, where the second format of the executable code is configured for use on:
   a field programmable gate array,
   a digital signal processor,
   an application specific integrated circuit, or
   a graphics processing unit.

3. The media of claim 1, where the one or more instructions for translating further comprise:
   one or more instructions for optimizing the second format of the executable code.

4. The media of claim 1, where the first code development environment or the second code development environment are implemented using a dynamically typed language that supports array-based programming, or a graphically-based language.

5. The media of claim 1, where the instrument is an oscilloscope or a spectrum analyzer.

6. The media of claim 1, wherein the instrument operates as a wireless receiver to receive a wireless signal that includes the data.

7. The media of claim 1, wherein the second format is a hardware description language.

8. The media of claim 1, wherein the specialized processing device includes:
   a field programmable gate array,
   a digital signal processor,
   an application specific integrated circuit, or
   a graphics processing unit.

9. The media of claim 1, wherein the specialized processing device is on the instrument.

10. The media of claim 1, wherein the specialized processing device is a remote device.

11. The media of claim 1, where the first code development environment or the second code development environment are dynamically typed.

12. The media of claim 1 further comprising one or more instructions for:
    receiving one or more edits to the executable code through the second code development environment at the instrument to produce modified executable code.

13. The media of claim 12, where the one or more edits are received when the result is not satisfactory.

14. The media of claim 12 further comprising one or more instructions for:
    processing either the data captured at the instrument or new data captured at the instrument using the modified executable code, where the processing of either the data captured at the instrument or the new data using the modified executable code produces a new result.

15. One or more non-transitory computer-readable media storing executable instructions that when executed by processing logic perform real-time processing of data, the media storing one or more instructions for:
    interacting with a first code development environment, at a remote computer, that supports creating executable code, the first code development environment providing predefined functionality; and
    sending the executable code from the first code development environment at the remote computer to a second code development environment that operates on an instrument, the second code development environment providing a subset of the predefined functionality of the first code development environment, the executable code configured to:
    run in the second code development environment that operates on the instrument, to evaluate one or more algorithms of the executable code for processing the data in non-real-time,
    run outside the second code development environment on processing logic in the instrument to process the data or new data in real-time, the executable code converted from a first format to a second format using a code generator at the instrument, the first format compatible with the second code development environment running on the instrument and the second format compatible with the processing logic, and
    generate a result based on the real-time processing of the data or the new data, the result displayed via a display, stored in storage, or transferred to a destination.

16. The media of claim 15, where the second code development environment evaluates the one or more algorithms of the executable code using a portion of the data.

17. The media of claim 15, where the first code development environment and the second code development environment run on non-real-time operating systems.

18. The media of claim 15, where the processing logic interacts with a real-time operating system.

19. The media of claim 15, where the executable code is further configured to:
   run outside the second code development environment on a second processing logic that resides on the instrument or that resides on another instrument, the second processing logic using code in a third format that is produced from the first format.

20. The media of claim 15, where the instrument is:
   an oscilloscope and the second format implements spectrum analyzer functionality in the oscilloscope, or
   a spectrum analyzer and the second format implements oscilloscope functionality in the spectrum analyzer.

21. The media of claim 15, wherein the processing logic includes:
   a field programmable gate array,
   a digital signal processor,
   an application specific integrated circuit, or
   a graphics processing unit.

22. The media of claim 15, wherein the second format is used on the instrument.

23. The media of claim 15, wherein the second format is used on a remote device.

24. A computer-implemented method for processing real-time data using an instrument, the method comprising:
   producing executable code implementing an algorithm in a code development environment on a client device, the code development environment providing predefined technical computing functionality when the executable code is executed;
   processing a first data file received from an instrument using the executable code to produce a client result, the client result indicating whether the algorithm implemented in the executable code is satisfactory;
   sending the executable code to a second code development environment operating on the instrument, the second code development environment providing at least a subset of the predefined technical computing functionality of the first code development environment on the client device;
   processing a second data file in the second code development environment operating on the instrument using the algorithm of the executable code to produce an instrument result, the second data file including data acquired by the instrument;
   converting the algorithm of the executable code from a first format compatible with the second code development environment into a second format compatible with real-time logic on the instrument, the converting performed when the instrument result is satisfactory;
   executing the algorithm in the real-time logic; and
   processing input data by the real-time logic using the executing algorithm to produce a real-time result.

25. The method of claim 24, where the second code development environment runs in a non-real-time operating system that is:
   a Microsoft Windows-based operating system;
   a MacOS-based operating system;
   a Linux-based operating system; or
   a Unix-based operating system.

26. The method of claim 24, wherein the real-time logic includes:
   a field programmable gate array,
   a digital signal processor,
   an application specific integrated circuit, or
   a graphics processing unit.

27. A system, comprising:
   an instrument; and
   a computing device coupled to the instrument, the computing device including:
      storage logic configured to:
      store executable code that implements an algorithm in a first code development environment having predefined functionality, the algorithm for processing a data file;
      processing logic to:
      process the data file using the executable code to produce a first result, and
      determine whether the executable code should be sent; and
      interface logic configured to:
      send the executable code from the computing device to the instrument when the processing logic determines that the executable code should be sent, where
   the instrument includes:
      non-real-time logic configured to:
      execute the executable code received from the interface logic of the computing device,
      process the data file or another data file using the received executable code to produce a second result,
      modify the algorithm, using a second code development environment operating on the instrument, when the second result is determined to be unsatisfactory, the modifying producing modified executable code having a modified algorithm, the second code development environment having a subset of the predefined functionality of the first code development environment, and
      convert the received executable code or the modified executable code into a real-time format, the real-time format including the algorithm or the modified algorithm, respectively, and
   real-time logic configured to:
      receive the real-time format, and
      process input data using the algorithm or the modified algorithm, the processing performed in real-time to produce a result.

28. The system of claim 27, wherein the real-time logic includes:
   a field programmable gate array,
   a digital signal processor,
   an application specific integrated circuit, or
   a graphics processing unit.

* * * * *

UNITED STATES PATENT AND TRADEMARK OFFICE
CERTIFICATE OF CORRECTION

| | | |
|---|---|---|
| PATENT NO. | : 8,782,618 B1 | Page 1 of 1 |
| APPLICATION NO. | : 12/102423 | |
| DATED | : July 15, 2014 | |
| INVENTOR(S) | : Thomas Gaudette | |

It is certified that error appears in the above-identified patent and that said Letters Patent is hereby corrected as shown below:

In the Claims:
Claim 27, col. 22, line 36 should read:
executable code to produce a second result, Signed and Sealed this
Thirty-first Day of March, 2015

Michelle K. Lee
*Director of the United States Patent and Trademark Office*